US012178320B2

(12) United States Patent
Gray et al.

(10) Patent No.: US 12,178,320 B2
(45) Date of Patent: Dec. 31, 2024

(54) RACK FOR TRANSPORTABLE AIRCRAFT LANDING SYSTEM

(71) Applicant: Advanced Navigation and Positioning Corp., Hood River, OR (US)

(72) Inventors: Frank Alton Gray, Medford, OR (US); Connor Michael Webb, Hood River, OR (US)

(73) Assignee: Advanced Navigation and Positioning Corp., Hood River, OR (US)

( * ) Notice: Subject to any disclaimer, the term of this patent is extended or adjusted under 35 U.S.C. 154(b) by 423 days.

(21) Appl. No.: 17/246,197

(22) Filed: Apr. 30, 2021

(65) Prior Publication Data

US 2022/0346549 A1 Nov. 3, 2022

(51) Int. Cl.
*A47B 81/00* (2006.01)
*G08G 5/00* (2006.01)

(52) U.S. Cl.
CPC ........... *A47B 81/00* (2013.01); *G08G 5/0013* (2013.01)

(58) Field of Classification Search
CPC . A47B 47/02; A47B 47/0058; A47B 47/0083; A47B 81/00; G08G 5/0013; G08G 5/0056; G08G 5/025; G08G 5/0026
See application file for complete search history.

(56) References Cited

U.S. PATENT DOCUMENTS 2,579,685 A * 12/1951 Loose .................. B65D 19/385 248/219.2
2,904,383 A * 9/1959 Potts .................. A63B 71/0045 211/1
3,378,320 A * 4/1968 Morgan .................. H05K 7/18 361/730
4,195,890 A * 4/1980 Kellogg ............. A47B 47/0083 312/265.2
4,261,470 A * 4/1981 Dolan ....................... F16B 7/22 403/237
4,364,710 A 12/1982 Campbell
4,669,790 A * 6/1987 Briggs .................. A47B 21/03 D6/671.1
5,205,630 A * 4/1993 Welch ................. A47B 47/021 211/187

(Continued)

FOREIGN PATENT DOCUMENTS

DE 29618124 U1 * 2/1997 ............. A47B 47/02
EP 1415573 A2 * 5/2004 ............. A47B 47/02

(Continued)

*Primary Examiner* — Stanton L Krycinski

(74) *Attorney, Agent, or Firm* — HALEY GUILIANO LLP

(57) ABSTRACT

Example illustrations of a storage rack configured to store a transportable aircraft landing system are disclosed. A storage rack may include a base structure configured to be secured upon a single pallet, and a plurality of vertically extending support members, or wall members, that are fixed to the base. The rack may thereby define an enclosure separated into a main enclosure and an upper enclosure elevated from the base structure. The storage rack may also include a hinged structure that is pivotally mounted and configured to enclose an interior storage area adjacent the enclosure in a closed position. The hinged structure may be pivotable from the closed position to an open position allowing access to the interior storage area.

20 Claims, 26 Drawing Sheets

(56) References Cited

U.S. PATENT DOCUMENTS

| | | | | | |
|---|---|---|---|---|---|
| 5,833,329 | A * | 11/1998 | Smith | A47B 43/00 312/3 |
| 5,924,779 | A * | 7/1999 | Krumholz | A47B 88/42 211/151 |
| 5,951,129 | A * | 9/1999 | Stein | B25H 3/00 312/328 |
| 6,102,496 | A * | 8/2000 | Parham | A47F 3/001 312/328 |
| 6,105,511 | A * | 8/2000 | Bridges | B65D 19/0026 312/265.5 |
| 6,267,253 | B1 * | 7/2001 | Jellicorse | B64D 9/00 296/3 |
| 6,301,841 | B1 | 10/2001 | Rhebergen et al. | |
| 6,533,372 | B1 * | 3/2003 | McCrossin | A47B 31/00 312/265.5 |
| 6,578,720 | B1 * | 6/2003 | Wang | A47F 5/01 211/186 |
| 6,789,859 | B1 * | 9/2004 | Ho | A47B 47/02 312/263 |
| 6,990,909 | B2 * | 1/2006 | Gosling | A47B 83/001 312/196 |
| 7,484,631 | B2 * | 2/2009 | Bothun | B62B 3/005 312/201 |
| 7,510,078 | B2 * | 3/2009 | Schmidt | B25H 3/003 206/372 |
| 7,963,533 | B2 * | 6/2011 | Bothun | A47F 5/108 280/47.35 |
| 7,997,213 | B1 * | 8/2011 | Gauthier | B65D 88/022 294/67.1 |
| 8,157,337 | B2 * | 4/2012 | Manalang | B25H 3/06 280/47.35 |
| 8,598,724 | B2 | 12/2013 | Ulanovskiy | |
| 8,692,405 | B2 | 4/2014 | Lavaur et al. | |
| 8,985,716 | B2 * | 3/2015 | Lundrigan | A47B 47/021 312/265.3 |
| 9,050,718 | B2 * | 6/2015 | Cole | A47B 9/12 |
| 9,084,484 | B2 * | 7/2015 | Vilkomirski | A47B 87/0223 |
| 9,388,599 | B2 | 7/2016 | Homsi | |
| 9,456,688 | B2 * | 10/2016 | Moyer | A47B 87/0276 |
| 9,476,409 | B2 | 10/2016 | Abiassi | |
| 9,532,484 | B2 * | 12/2016 | Franklin | H05K 7/183 |
| 9,701,425 | B2 * | 7/2017 | Lee | B64F 1/362 |
| 9,924,613 | B2 * | 3/2018 | Pace | A47B 47/0091 |
| 10,293,478 | B2 * | 5/2019 | Grela | B25H 3/04 |
| 10,392,827 | B2 | 8/2019 | Homsi | |
| 10,765,029 | B2 * | 9/2020 | Bonenfant | H05K 7/1497 |
| 11,225,808 | B2 | 1/2022 | Marais | |
| 11,571,051 | B2 * | 2/2023 | Tieu | A45C 15/00 |
| 2005/0057011 | A1 * | 3/2005 | Chang | B62B 3/003 280/47.35 |
| 2005/0109723 | A1 * | 5/2005 | Czerwinski | A47B 47/0083 211/183 |
| 2005/0132924 | A1 * | 6/2005 | Bothun | A47B 61/00 104/307 |
| 2006/0076306 | A1 * | 4/2006 | Bothun | A47B 53/02 211/162 |
| 2006/0213402 | A1 * | 9/2006 | Grimal | B65D 19/44 108/51.11 |
| 2006/0231517 | A1 * | 10/2006 | Bothun | B62B 3/005 211/151 |
| 2006/0243690 | A1 * | 11/2006 | Mollard | B65D 19/44 211/151 |
| 2008/0272676 | A1 * | 11/2008 | Eustace | A47B 47/0083 312/243 |
| 2014/0239139 | A1 * | 8/2014 | Opsomer | F16M 13/00 248/329 |
| 2016/0305147 | A1 | 10/2016 | Homsi | |
| 2018/0360211 | A1 * | 12/2018 | Lu | A47B 96/1433 |
| 2019/0327849 | A1 * | 10/2019 | Ding | A47B 47/0091 |
| 2021/0394955 | A1 * | 12/2021 | Leng | A47B 87/0215 |
| 2022/0346549 | A1 | 11/2022 | Gray et al. | |
| 2022/0349204 | A1 | 11/2022 | Gray et al. | |

FOREIGN PATENT DOCUMENTS

| | | | | |
|---|---|---|---|---|
| FR | 2705019 | A1 * | 11/1994 | A47B 47/02 |
| GB | 866280 | A * | 4/1961 | |

* cited by examiner

RACK FOR TRANSPORTABLE AIRCRAFT LANDING SYSTEM

INTRODUCTION

Transponder-based aircraft landing systems generally facilitate guidance of aircraft during approach and landing with respect to an airport or other landing field. Typical transponder-based systems include electronics, antennas, and other equipment for sending and receiving signals to incoming aircraft to facilitate aircraft guidance. While these landing systems may be permanently installed at a landing field, deployable instrument landing systems (ILSs) have also been developed that can be deployed to a remote airfield and/or taken down from the airfield relatively quickly, e.g., for defense and emergency response applications. Known deployable ILSs can provide multiple essential functions for air operations at remote or temporary airfields including precision approach guidance, secondary surveillance for tracking and separation (ATC), and precision approach radar for ground-controlled approaches in military and/or emergency applications, thus providing a complete ATC solution.

Existing deployable ILSs generally include electronics, multiple antennas, power supply, and other components, and as a result are complex and difficult to transport. Existing deployable ILSs also generally require delivery to the remote airfield in multiple large, heavy payloads. Additionally, deployment of these ILSs typically requires at least approximately 18 man-hours of installation time (e.g., 6 hours by 3 personnel) once the equipment is delivered to the location for the remote airfield.

As a result, delivery and deployment of known deployable ILSs to a remote airfield requires multiple deliveries or delivery vehicles, and setup of the deployable ILS is time-intensive upon delivery. Accordingly, there is a need for an improved landing system that addresses these shortcomings.

SUMMARY

In at least some example illustrations described herein, a storage rack is provided, e.g., for storing a transportable aircraft landing system. The aircraft landing system may include a plurality of remote antenna assemblies, a plurality of modular tower sections, at least one base station antenna, control electronics for the base station antenna and the plurality of remote antenna assemblies, and at least one power generator configured to generate electrical power for at least the control electronics. The storage rack may include a base structure configured to be secured upon a single pallet, and a plurality of vertically extending support members fixed to the base and at least partially defining an enclosure. The enclosure may be separated into a main enclosure and an upper enclosure elevated from the base structure. The storage rack may also include a hinged structure pivotally mounted to the support members, which is configured to enclose an interior storage area adjacent the enclosure in a closed position. The hinged structure may be pivotable from the closed position to an open position allowing access to the interior storage area.

In at least some implementations, a storage rack is provided for storing a transportable aircraft landing system, e.g., including a plurality of remote antenna assemblies, a plurality of modular tower sections, at least one hub antenna, control electronics for the hub antenna and the plurality of remote antenna assemblies, and at least one power generator configured to generate electrical power for at least the control electronics. The storage rack may include a base structure configured to be secured upon a single pallet, and a plurality of wall members fixed to the base and extending vertically to at least partially define an enclosure, the enclosure separated into a main enclosure and an upper enclosure elevated from the base structure. The storage rack may also include a hinged structure pivotally mounted to one or more of the wall members. The hinged structure may be configured to enclose an interior storage area adjacent the enclosure in a closed position. The hinged structure may be pivotable from the closed position to an open position allowing access to the interior storage area.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
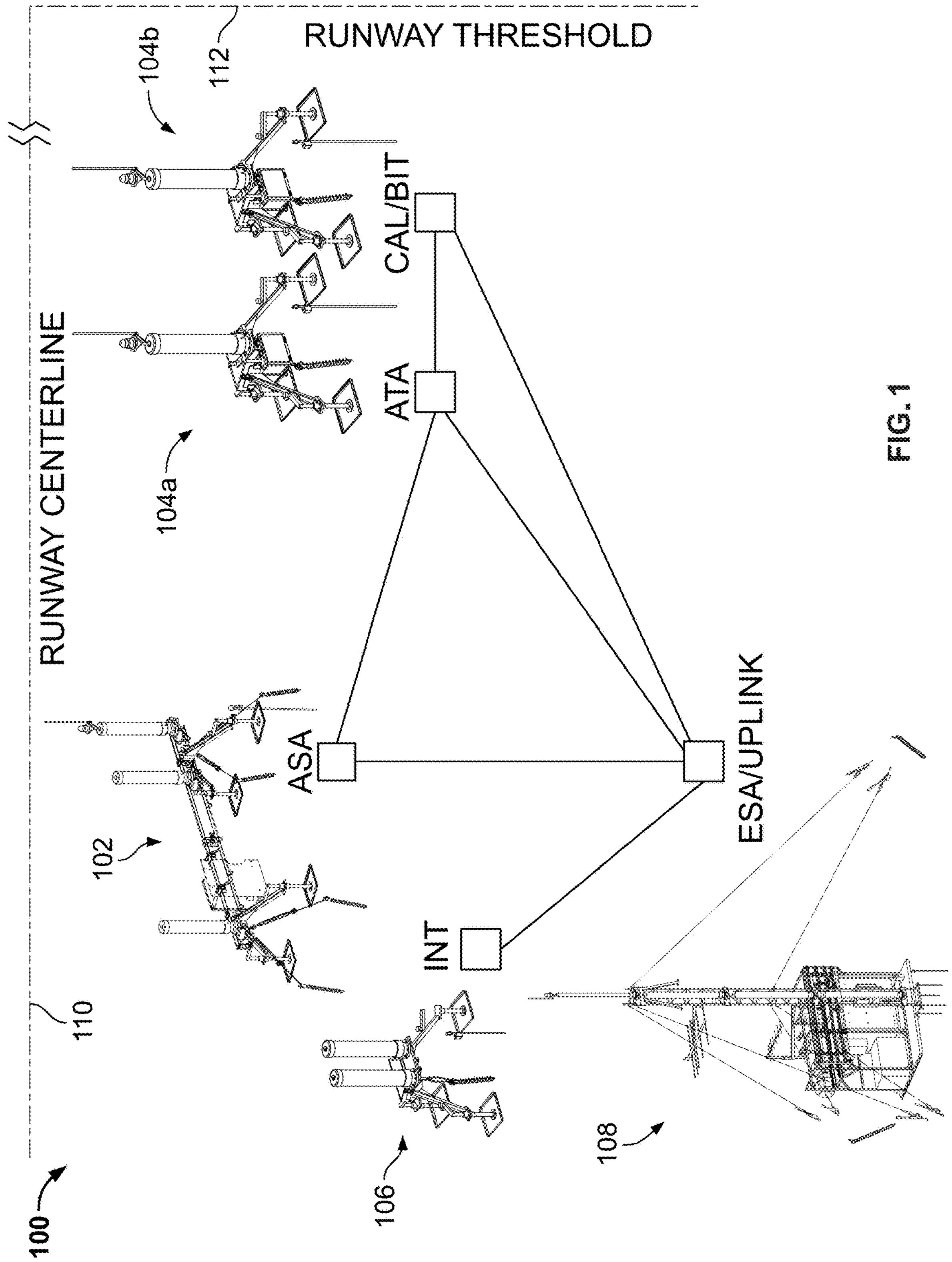
FIG. 1 shows a schematic illustration view of a deployable instrument landing system (DILS) for an aircraft upon deployment, in accordance with one example illustration.

Example illustrations herein are directed to a transponder-based landing system for an aircraft that is generally more compact, portable, and simplified, thereby allowing easier transport and quicker setup and takedown of the system. For example, the system may be stowed on a single pallet to allow relatively easy transport. Some example systems are also significantly lighter than previously known systems, and may in some examples weigh no more than 5,000 pounds. Accordingly, transport of the system may be accomplished by most cargo or military aircraft. In addition to the system being relatively smaller and lighter, some components of the system may be relatively simplified and/or may be configured for storage on a rack structure that facilitates a relatively quicker setup and/or takedown of the system. For example, as discussed further below an example system may be setup in no more than four man-hours (e.g., two personnel in less than two hours).

As noted above, some example deployable instrument landing systems (DILSs) may be stowed on a relatively small storage rack that fits upon a standard pallet for shipping, e.g., by an aircraft. The rack/pallet may be air-dropped in some implementations. A system may be stowed on a rack in a disassembled state and fit upon a single pallet for shipping. In one example, the system is packaged onto a 463 L master pallet, which is the standard pallet for transporting military air cargo and is designed to be loaded and offloaded on military airlifters as well as many civilian cargo aircraft. These pallets are typically formed of a lightweight core surrounded by a metallic skin, e.g., a balsa wood core surrounded with an aluminum skin. The usable space of a standard 463 L pallet typically weighs approximately 300 pounds and may hold up to 10,000 pounds of payload weight (not exceeding 250 lb/in$^2$). The useable surface area or footprint of a 463 L pallet for cargo is typically approximately eight feet by eight feet. Example systems as disclosed herein may be fit upon a single 463 L pallet, as noted above. By contrast, previous systems required a significantly larger shipping container, e.g., an enclosed Conex shipping container having a footprint of 20 feet by 8 feet.

Additionally, components of the DILS may be configured to facilitate a relatively rapid assembly/takedown upon receipt of the DILS rack/pallet. For example, as will be described further below, one or more components of the system may have features to facilitate assembly in a short period of time or may consolidate features of multiple components into a reduced number of components. As a result, example systems as described herein may be deployed or set up in less than four man-hours (e.g., in two hours by two service personnel), and disassembled again and stowed on the storage/shipping rack in less than two man-hours (e.g., in one hour by two service personnel). Accordingly, example DILSs may generally be rapidly deployed as an air-traffic control and landing solution in virtually any runway environment or remote airfield, e.g., for defense and emergency response organizations.

Turning now to FIG. 1, an example deployable instrument landing system (DILS) 100 is illustrated in a deployed state. The transponder landing system may generally be capable of providing guidance to an approaching aircraft by way of transponder signals received from and/or transmitted to the aircraft, e.g., in the manner described in U.S. Pat. No. 6,469,654 or 6,816,105, each of which is incorporated herein by reference in its entirety. Generally, the system 100 uses ground-based sensors to determine an incoming aircraft's position in three dimensions from signals transmitted by a transponder on the aircraft. A localizer and/or a glide slope signal may be generated based on the aircraft position relative to a horizontal approach path and/or a vertical approach path, respectively. Accordingly, system 100 may generally provide an instrument landing system (ILS) approach to the aircraft to guide a pilot of the aircraft to a runway threshold. Accordingly, the system 100 facilitates a precision approach by the pilot to minimum decision heights, consistent with an ILS approach.

In the example illustrated in FIG. 1, a system 100 generally includes a plurality of remote antenna assemblies 102,

104*a*, 104*b*, 106, and a hub or base station 108. Generally, the remote antenna assemblies 102, 104*a*, 104*b*, and 106 are configured to facilitate communication between one or more approaching aircraft and the base station 108 to provide guidance to the aircraft as it approaches a landing field upon which the system 100 is deployed. The remote antenna assemblies 102, 104*a*, 104*b*, 106, and base station 108 may generally serve as ground-based sensors for incoming aircraft transponder signals and may be positioned relative to a runway centerline 110 and runway threshold 112 as illustrated in FIG. 1. More specifically, the system 100 may be generally offset laterally with respect to the runway centerline 110 and adjacent the runway threshold 112. The base station 108, remote antenna assembly 102, and remote antenna assembly 104*a* may be positioned relative to each other on the ground as shown in FIG. 1, i.e., forming a generally equilateral triangle. The remote antenna assembly 104*b* may be positioned adjacent the remote antenna assembly 104*a*, spaced from the remote antenna assembly 104*a* in a direction parallel to the runway centerline 110. The remote antenna 106 may be positioned on the ground adjacent the base station 108, e.g., with the remote antenna 106 being spaced laterally and longitudinally from the base station 108 (with respect to the runway centerline 110) by an equal distance as shown in FIG. 1. Aircraft may approach the runway from either direction, generally parallel to the runway centerline 110.

Figure 2:
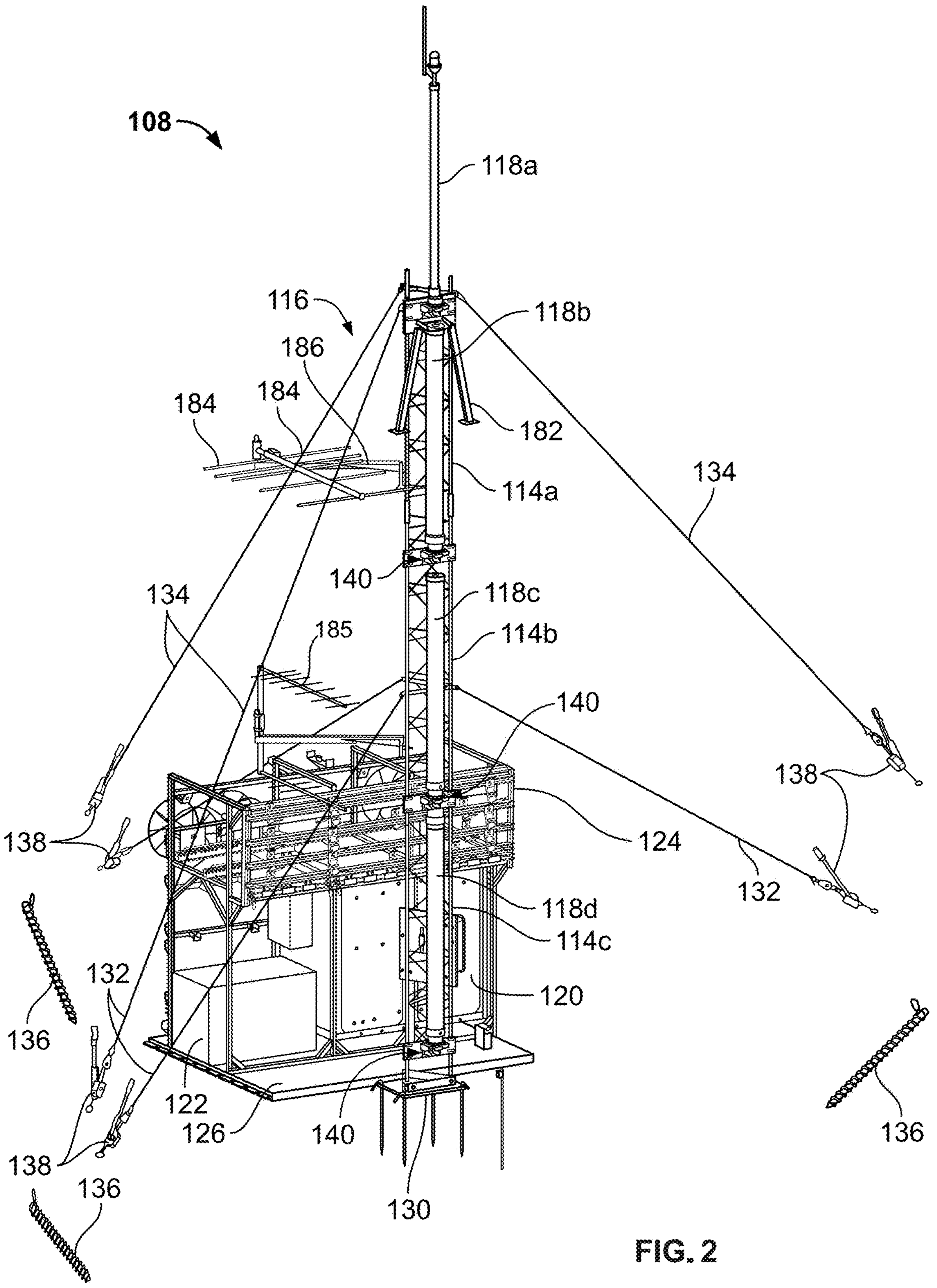
FIG. 2 shows a base station and ground tower assembly for the system of FIG. 1, according to an example.

Referring now to FIG. 2, the base station 108 is shown in further detail. As noted above, the base station 108 may sense incoming transponder signals from an aircraft, and use the remote antenna assemblies 102, 104*a*, 104*b*, and 106 to determine location and approach of the aircraft. The base station 108 may be an elevation sensor assembly (ESA) configured to determine elevation of an incoming aircraft based upon transponder signals received from the aircraft. As best seen in FIG. 2, the base station 108 may include a plurality of modular tower sections 114*a*, 114*b*, 114*c* (collectively, 114) that define a support structure for a ground tower 116. A main antenna 118 of the hub/base station 108 may be supported by the ground tower 116, and may comprise one or more antenna sections 118*a*, 118*b*, 118*c*, 118*d*. The antenna sections 118*a*, 118*b*, 118*c*, 118*d* may be individual antennas with separate/different functions within the system 100, or they may be employed as a single antenna structure from the assembled sections 118*a*, 118*b*, 118*c*, 118*d*. An uppermost one of the antenna sections, e.g., section 118*a*, may be fixed atop the uppermost tower section, e.g., tower section 114*a*, allowing an overall shorter tower structure as defined by the tower sections 114, and also a generally 360-degree "line of sight" of the antenna section 118*a*. The antenna section 118*a* may be omnidirectional, while in an example the sections 118*b*, 118*c*, and 118*d* are directional antennas. The base station 108 may further include control electronics for the main antenna 118 and remote antenna assemblies 102/104/106, with the control electronics contained within a rack or housing 120, as will be described further below. The base station 108 also may include at least one power generator 122 that generates electrical power for the control electronics. The power generator 122 may be an uninterruptible power supply (UPS), e.g., including multiple types of power generators to ensure that power supplied to the system 100 is generally not interrupted. In one example, the power generator 122 includes a solar-powered generator and an internal combustion engine generator. The solar-powered generator may be used in any manner that is convenient, e.g., to charge a battery (not shown) for starting the internal combustion engine generator.

The base station 108 may be generally supported by a rack assembly 124 mounted to a base surface or pallet 126. As will be discussed further below, the rack assembly 124 generally facilitates a compact storage of components of the system 100 illustrated in FIG. 1 in a disassembled state. Accordingly, each of the remote antenna assemblies 102, 104*a*, 104*b*, and 106, the base station 108, control electronics, etc. may be stowed on the rack assembly 124 and pallet 126, e.g., for transport. In the deployed state of base station 108 in FIG. 2, the rack 124 generally may be secured to the pallet 126, which may be positioned on a ground surface.

The base station 108 and/or components of the base station 108 may have various features that facilitate the base station 108 being stowed for transport on the rack 124 and deployed or stowed relatively quickly. In one example, the ground tower 116 may provide multiple elevated components or associated functions for the system 100 that are consolidated in the single ground tower 116. Accordingly, the system 100 requires only the single ground tower 116, and additional elevated structures in the system 100 are not required. For example, the main antenna 118 may be mounted to the ground tower 116. Additional structures may also be mounted to the ground tower 116, such as laterally extending antennas 184, which are supported by a support arm or boom 186. The antennas 184 may form a uplink localizer antenna array configured to uplink guidance signal (s) generated by the base station 108 to aircraft. In contrast to previous deployable ILS systems, the boom 186 may support multiple antenna structures. An additional antenna 185 may be provided that is fixed to the base station 108, as illustrated in FIG. 2. The antenna 185 may be a Yagi antenna that is an uplink glide slope antenna. In the example illustrated, the antennas 184 and 185 generally provide all wireless antennas for radio communication of the system 100 to aircraft, and as a result it may not be necessary to mount additional antennas for aircraft radio communication to the base station 108 or other components of the system 100. Additionally, the assembled tower sections 114*a*, 114*b*, 114*c* illustrated in the Figures defines an overall height of approximately 24 feet, with the antenna 118*a* defining an additional 6 feet further, resulting in a total height of the ground tower of approximately 30 feet. This configuration allows sufficient height of the ground tower 116 to provide adequate separation of components, e.g., antennas 184, antenna 118*a*, other distance measuring equipment (DME) antennas, etc., while also being sufficiently compact to allow stowage of the ground tower 116 on the rack upon disassembly. Additionally, the antenna 118*a* is illustrated as being mounted atop the tower sections 114*a*-114*c*, and thereby is advantageously provided a clear "line of sight" of 360 degrees about the ground tower 116.

The ground tower 116 may be supported upon a stationary base 130. As will be discussed further below, the base 130 may facilitate a relatively quick assembly and raising of the ground tower 116. For example, the base 130 may be secured to the pallet 126 and may have a pivoting connection between the ground tower 116 and the base 130 that allows the ground tower 116 to be assembled in a generally horizontal or lowered position, e.g., as will be discussed further in reference to FIG. 13A or 13B, and raised to an operational or substantially vertical position, e.g., as illustrated in FIGS. 2 and 13C. The stationary base 130 and/or the pallet 126 may have one or more stakes or augers that may be driven into the ground, thereby securing the base 130 and/or pallet 126.

The ground tower 116 may also have components to facilitate assembly and/or raising of the ground tower 116. For example, as shown in FIG. 2, the ground tower may have a stand 182, which is shown positioned on an upper tower section 114*a*. The stand 182 is illustrated in a stowed or collapsed position against the upper tower section 114*a*. As will be discussed further below, the stand 182 may be pivotable with respect to a tower section 114 upon which it is installed. Accordingly, the stand 182 may also be positioned in an extended position (not shown in FIG. 2) to provide support for the ground tower 116 and/or various sections 114 thereof during assembly and/or raising of the ground tower 116.

The ground tower 116 may be supported by a plurality of guy wires or cables to maintain the vertical position of the tower 116 after installation. For example, as best seen in FIG. 2, three lower cables 132 and three upper cables 134 may each be secured to the ground tower 116 at a respective first end. A second end of each of the lower and upper cables 134 may be secured to a plurality of cable augers 136, with each of the augers 136 supporting a single lower cable 132 and a single upper cable 134 (the lower cables 132 and upper cables 134 are shown disconnected from the cable augers 136). Further, each of the upper and lower cables 132, 134 may be tensioned by way of rapid tensioning mechanisms 138, with each positioned at the end of the cables 132, 134 closest to the ground/cable augers 136 (after connection of the cables 132, 134 to their respective augers 136).

In another example, the ground tower 116 may also employ "toolless" latch mechanisms 140 for securing components to the ground tower 116, e.g., the main antenna 118. More specifically, latch mechanisms 140 may generally be opened and closed by hand to selectively clamp components to the ground tower 116, as will be discussed further below. In the example illustrated in FIG. 2, a pair of latches 140 are used to clamp each antenna section 118*a*, 118*b*, and 118*c* to the ground tower 116. Each pair of latches 140 clamps a respective antenna section 118*a*, 118*b*, and 118*c* to the ground tower 116, further simplifying assembly of the ground tower 116 and antenna(s) 118. Further, similar latches may be used throughout the system 100, as will be discussed further below.

Figure 3:
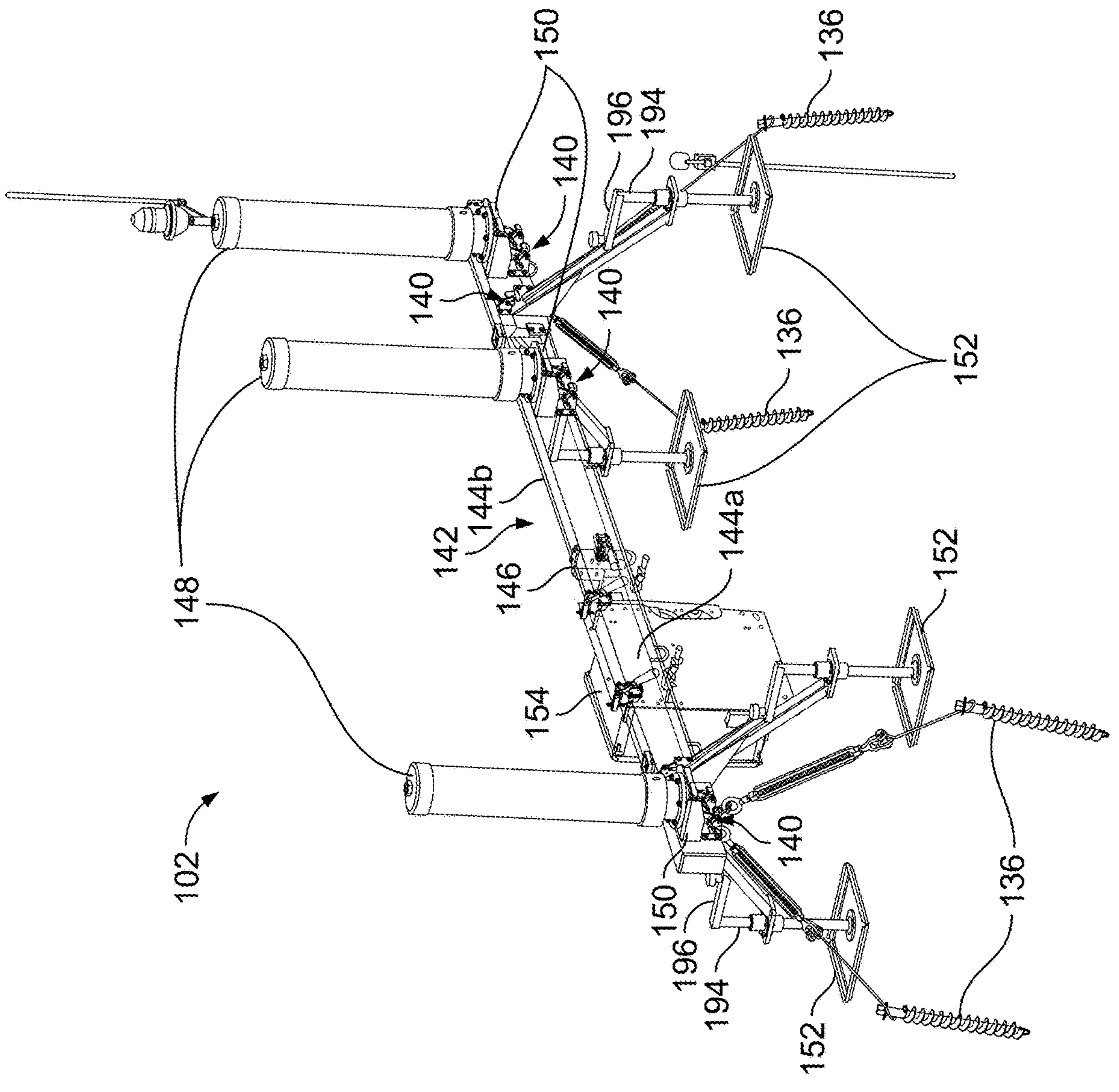
FIG. 3 shows a first remote antenna assembly, which is used as an azimuth sensor assembly (ASA) antenna in the system of FIG. 1, according to an example.
Figure 5:
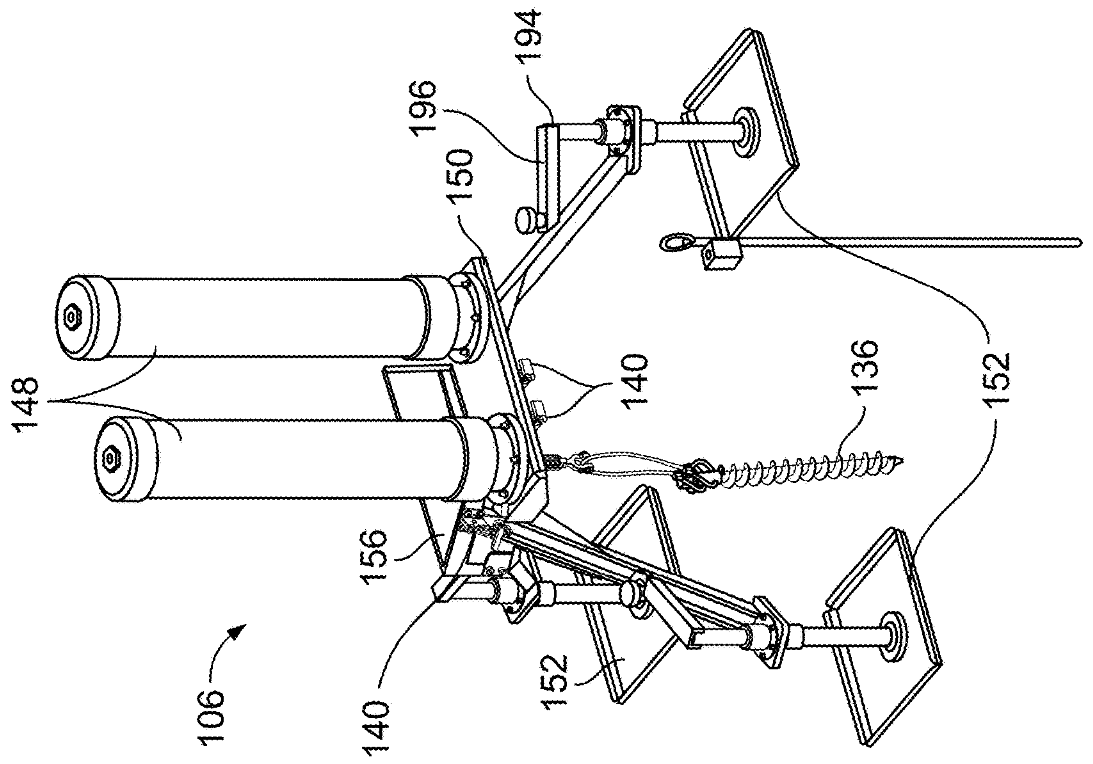
FIG. 5 shows a third remote antenna assembly, which is used as an Interrogation Transmitter (INT) antenna in the system of FIG. 1, according to one example.
Figure 4:
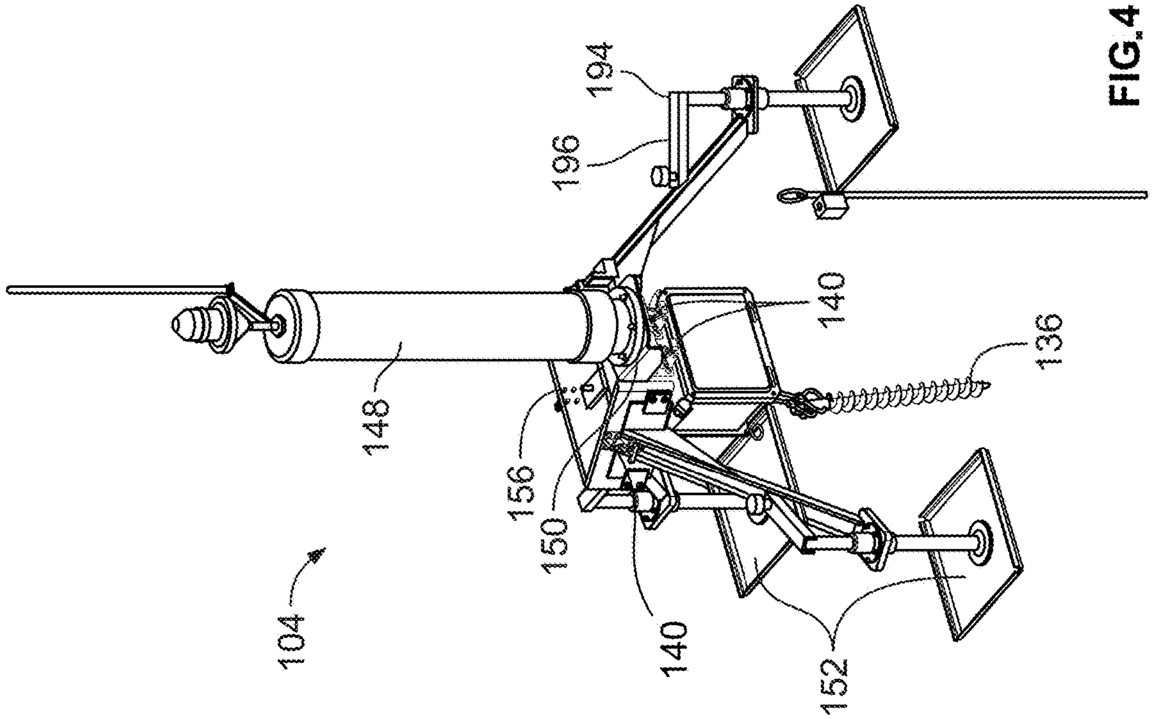
FIG. 4 shows a second remote antenna assembly, which is used as both (a) an Alternate Time of Arrival (ATA) antenna and (b) a Calibration and Built-In-Test (CAL/BIT) antenna in the system of FIG. 1, according to one example approach.

Turning now to FIGS. 3-5, the remote antenna assemblies 102, 104*a*, 104*b*, and 106 are illustrated and described in further detail. Referring to FIG. 3, the remote antenna assembly 102 may be employed as an azimuth sensor assembly (ASA) antenna in the system 100. Accordingly, the remote antenna assembly 102 may generally facilitate determining azimuth of an approaching aircraft based upon transponder signals from the aircraft. The remote antenna assemblies 104*a* and 104*b* may be generally identical in structure to each other. Accordingly, a single remote antenna assembly 104 is illustrated in FIG. 4, which may be employed as an Alternate Time of Arrival (ATA) antenna 104*a*, and also as a Calibration and Built-In-Test (CAL/BIT) antenna 104*b* in the system 100, as seen in FIG. 1. The remote antenna assembly 106 illustrated in FIG. 5 may be employed as an Interrogation Transmitter in the system 100.

Each of the remote antenna assemblies 102, 104*a*, 104*b*, and 106 may have various features that facilitate a smaller size and/or lighter weight of the assemblies, at least when stowed onto the rack 124. For example, the remote antenna assembly 102 of FIG. 3 includes a hinged support beam 142 to which components of the remote antenna assembly 102 are secured when the system 100 is deployed, and which may be stowed on the rack 124 in a relatively small packaging space. The hinged support beam 142 may include two longitudinal bodies 144*a*, 144*b* which are joined together at a hinge 146. The longitudinal bodies 144 may each define a box-shaped, I-shaped, or other section profile convenient for securing components to the support beam 142. In the example illustrated in FIG. 3, three antennas 148 are secured to the support beam 142, in a generally spaced relation to one another along the beam 142. More specifically, a plurality of latches 140 may be used to secure the antennas 148 to the support beam 142 by way of respective antenna support bases 150. The remote antenna assembly 102 may also include a plurality of ground stands 152, which are also secured to the support beam 142 via respective latches 140. Each of the ground stands 152 may have a vertical extension arm 194 that allows vertical height adjustment of its respective ground stand 152. For example, as shown in FIG. 3 each vertical extension arm 194 may be threaded, such that rotation of a radial member 196 of the vertical extension arm causes the ground stand 152 to be raised or lowered relative to the support beam 142, depending on the direction of rotation of the radial member 196. A plurality of augers 136 may be provided to secure the remote antenna assembly 102 in place upon a ground surface. The remote antenna assembly 102 may also include an antenna electronics box 154, which may generally include hardware and/or software, e.g., to facilitate communication regarding transponder signals received via the remote antenna assembly 102 with the base station 108. With the antennas 148, electronics box 154, and ground bases 152 removed from the hinged support beam 142, the hinged support beam 142 may generally be folded in half, i.e., via the hinge 146, to permit the support beam 142 to fit within the rack 124. Accordingly, the entire remote antenna assembly 102 may be relatively easily disassembled and stowed within the rack 124 to allow the system 100 to be transported on the pallet 126.

Each of the remote antenna assemblies 102, 104, and 106 may also employ latches 140 to reduce the need for tools or equipment to set up or install the remote antenna assemblies 102, 104, and 106. For example, as noted above and shown in FIG. 3, latches 140 may be employed in the remote antenna assembly 102 to secure the antennas 148 to the support beam 142. The remote antenna assemblies 104*a*, 104*b*, and 106 may also employ latches 140 for securing similar components, as shown in FIGS. 4 and 5. More specifically, remote antenna assembly 104 and remote antenna assembly 106 may each have one or more antennas 148 supported on an antenna support base 150, which is secured to a body 156 with a pair of latches 140. Further, the remote antenna assembly 106 employs a single antenna support base 150 for two antennas 148. Ground stands 152 may be secured to the body 156 of each of the remote antenna assemblies 104, 106 with a pair of latches 140. A plurality of augers 136 may secure each of the remote antenna assemblies 104, 106 to a ground surface. Lightning protection may be provided, e.g., by way of lightning rods or the like.

Figure 6A:
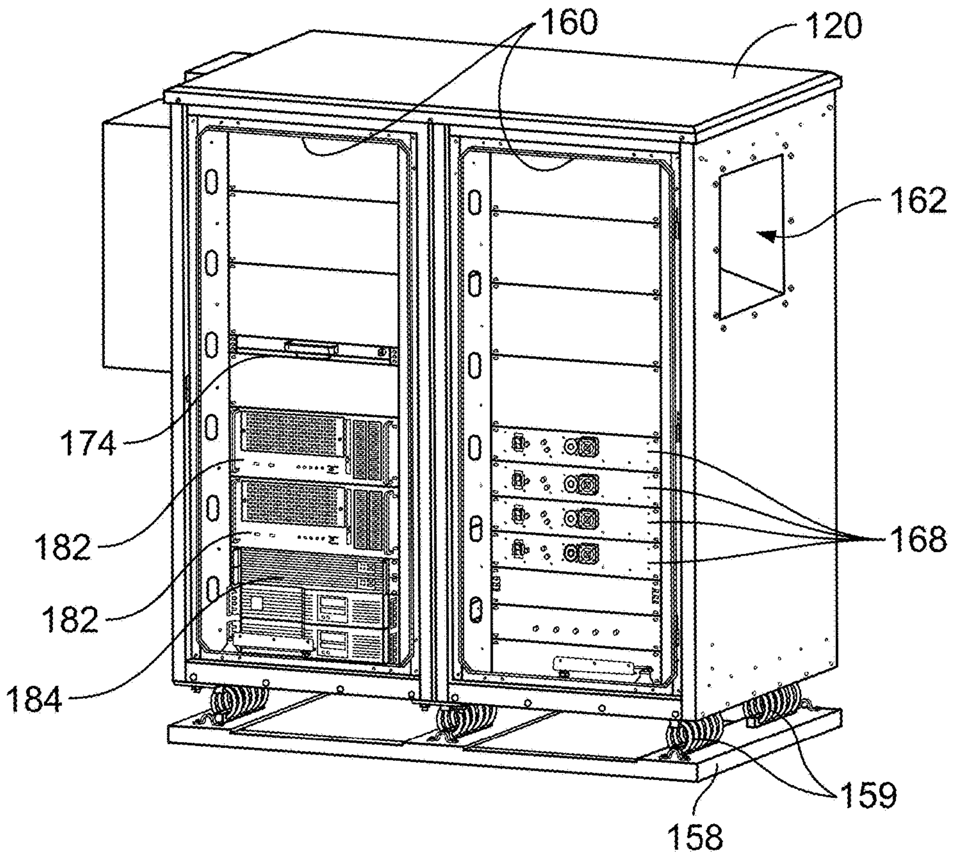
FIG. 6A shows a front perspective view of control electronics for the base station of FIG. 2, according to one example.
Figure 6B:
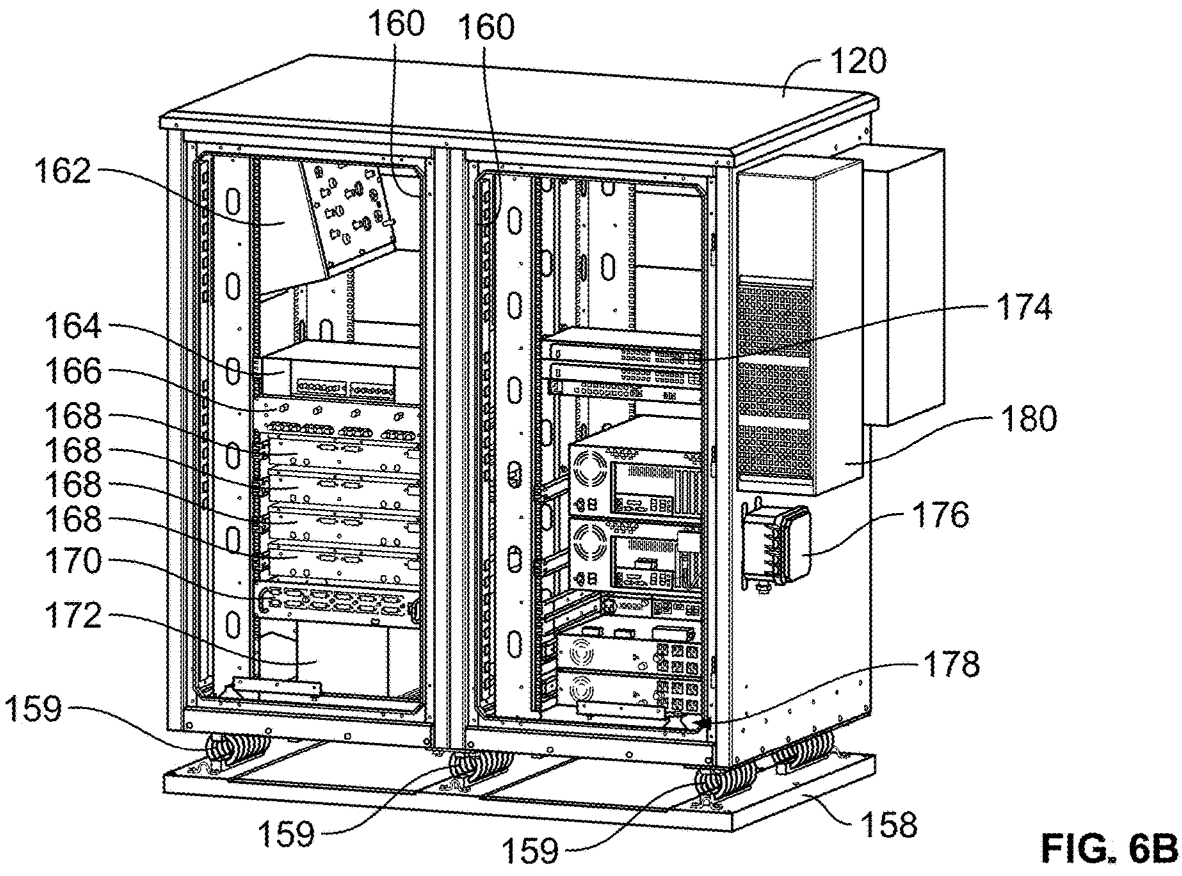
FIG. 6B shows a rear perspective view of the control electronics for the base station of FIGS. 2 and 6A, in accordance with an example.

Turning now to FIGS. 6A and 6B, the control electronics of the base station 108 are illustrated and described in further detail, according to an example illustration. The control electronics may be provided within the housing 120, which is supported upon a base 158. One or more compliant springs 159 may be provided between the base 158 and the housing 120 to provide vibration and/or shock isolation between the base 158 and housing 120. The base 158 may be secured to the pallet 126 (not shown in FIGS. 6A/6B)

within the rack 124 (not shown in FIGS. 6A/6B) or may be secured directly to the rack 124. The housing 120 generally includes a modular or other internal structure, e.g., shelves, to allow various control electronics and related components to be installed within the housing 120. The shelves may be configured to slide relative to the housing 120, e.g., to facilitate access to components within the housing 120, or installation/removal of components within the housing 120. Alternatively, the shelves may be fixed to the housing 120. The housing 120 may also define one or more openings 160 on front, back, and/or side surfaces of the housing 120 to allow access to the control electronics. The openings 160 may be provided with doors, windows, or any other closure mechanism (not shown in FIGS. 6A/6B) to protect the control electronics from the external environment.

In the example illustrated in FIGS. 6A and 6B, the control electronics include an interface panel 162, a fiber panel 164, combiner 166, one or more guidance transmitter units (GTU) 168, a parallel port switch 170, a small form factor interrogator (SFF-44 INT) 172, a user interface (e.g., buttons, softkeys, keyboard, video display, and/or mouse) 174, a power input 176, a transformer 178, and an environmental control unit 180. Core system processing computers 182 may be included in the control electronics. The core system processing computers generally process signal data from sensors and create tracks that are used to display surveillance data and to guide an aircraft on approach. The two core system processing computers 182 illustrated generally process data identically with different operating systems and/or processors. For example, the control electronics may be configured such that both core system processing computers 182 are required to determine a same answer or calculation, otherwise the guidance will be shutdown or a warning generated as a failure mode mitigation measure. The core system processing computers 182 also include system control coordinators, e.g., with one of the core system processing computers 182 as a master over the other, that control system states of the control electronics. The control electronics may also include a Maintenance Interface Unit (MIU) 184. MIU 184 may generally start and stop the system 100, configure the system 100 prior to start, observe status of the system 100, troubleshoot errors, and generally maintain the system 100 or the control electronics. The MIU 184 may also provide a user interface to operational features of the system 100, allowing a common interface to different deployable ILSs. In addition to the foregoing components of the control electronics, any other components convenient for the operation of the system 100 may also be provided.

Figure 7:
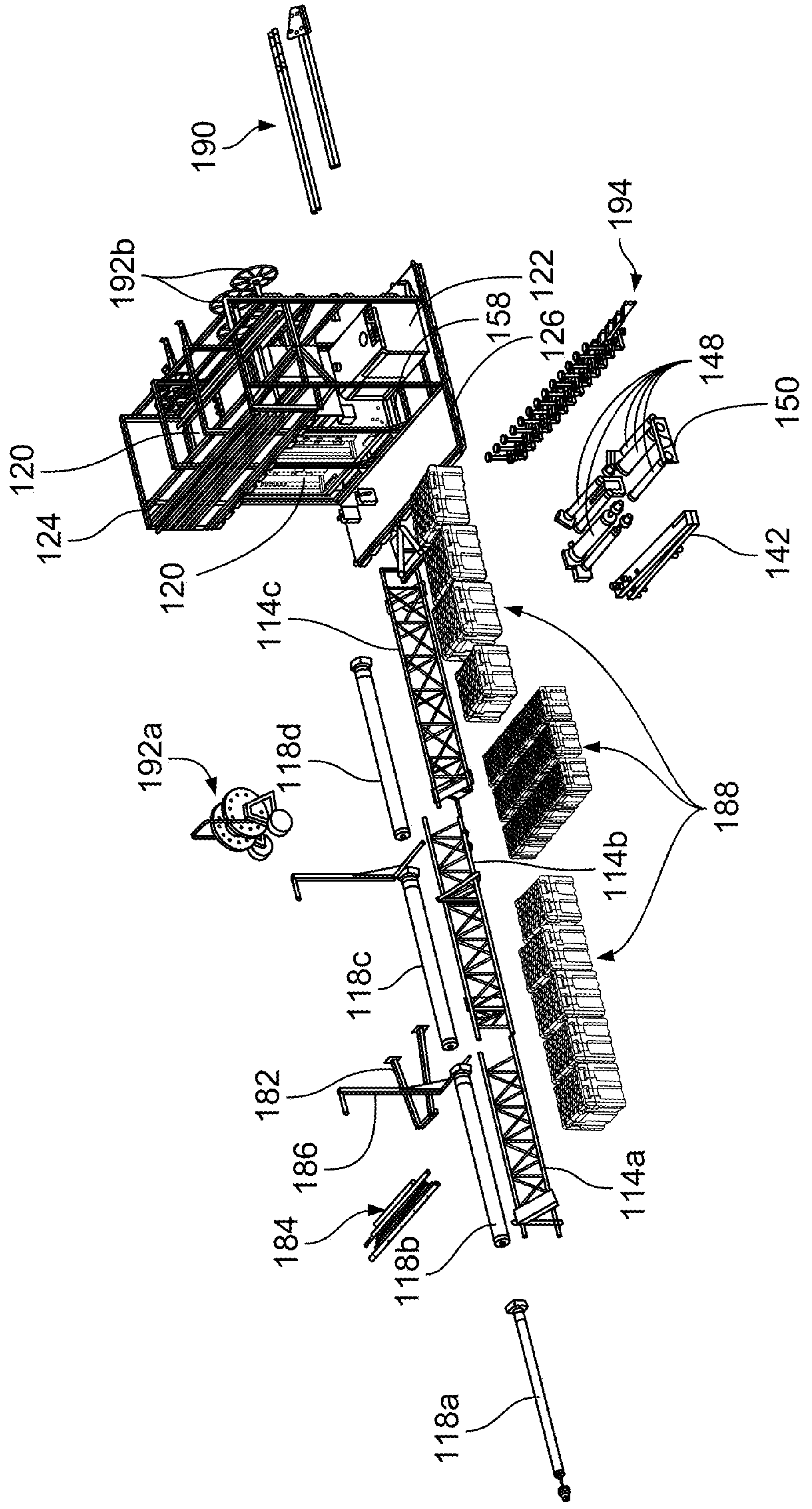
FIG. 7 shows the system of FIG. 1 in a disassembled state and ready for stowage on a shipping rack and pallet, according to an example.

Turning now to FIG. 7, the system 100 is illustrated in a disassembled state and ready for stowage on the rack 124. More specifically, the tower sections 114*a*, 114*b*, 114*c* are illustrated separated and ready for placement upon the rack, as are antenna sections 118*a*, 118*b*, 118*c*, and 118*d*. The antenna sections 118*a*, 118*b*, 118*c*, 118*d* may be individual or separate antennas. Alternatively, one or more, and in some cases all of the sections 118*a*-118*d*, may be assembled to form a larger antenna or antenna section. The housing 120 and power generator 122 may remain on the rack 124 and/or pallet 126 and may be permanently or semi-permanently installed on the rack 124 and/or pallet, e.g., by way of the base 158 and springs 159 (not shown in FIG. 7) described above. Other components mounted to the ground tower 116 (see FIG. 2) such as the stand 182, laterally extending antenna(s) 184, and the support arm 186 of the laterally extending antenna 184 may also be disassembled from the tower sections 114. Additionally, the laterally extending antenna(s) 184 may be disassembled into smaller elongated components, as shown in FIG. 7. A plurality of transit cases 188 may be provided, which provide for storage of smaller components. The transit cases 188 may be configured to be stored on the rack 124, as will be discussed further below. A pivot assembly 190 is shown disassembled and may also be stored on the rack 124. The pivot assembly 190 may be used in raising and/or lowering the assembled ground tower 116, as will be discussed further below. One or more hose or wire reels 192*a*, 192*b* (collectively, 192) may be provided for storage of cable, wire, rope, or other flexible elongated members employed in the system 100. Reel 192*a* may be separable from the rack 124 to allow movement away from the rack 124 and/or pallet 126, while reels 192*b* may be permanently or semi-permanently installed upon the rack 124. Additionally, the vertical extension arms 194 are also shown disassembled for storage on the rack 124.

Figure 8A:
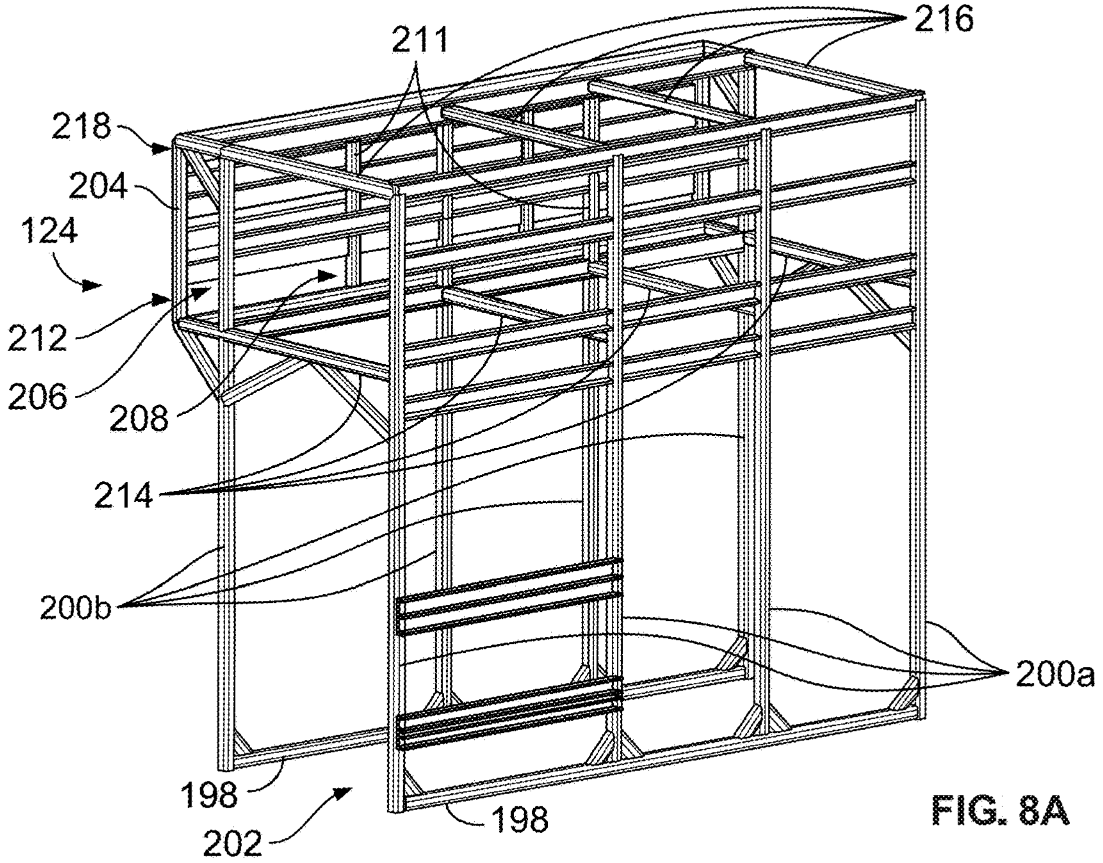
FIG. 8A shows a front perspective view of the storage/shipping rack for the system of FIGS. 1-7, according to one example.
Figure 8B:
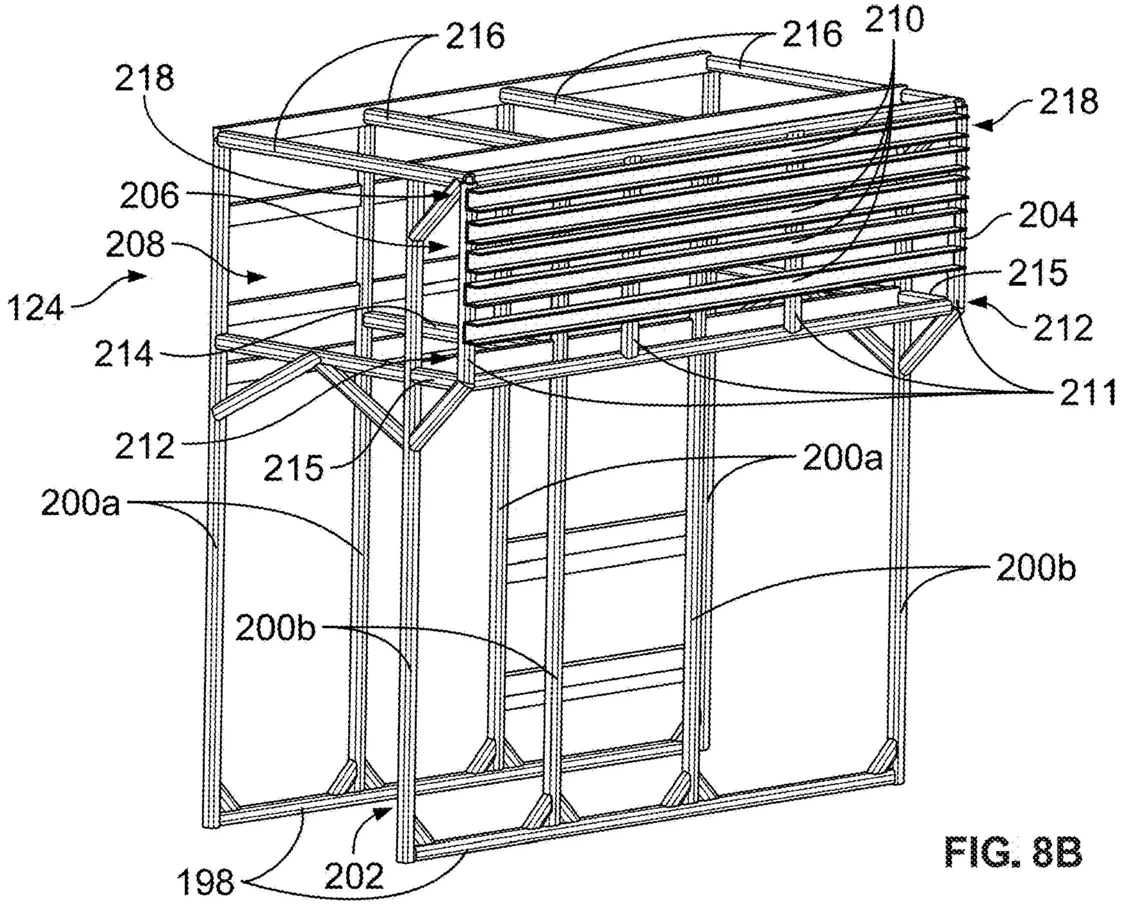
FIG. 8B shows a rear perspective view of the storage rack of FIG. 8A, according to an example.

Turning now to FIGS. 8A and 8B, the rack 124 is shown and described in further detail. The rack 124 may include a base structure 198 configured to be secured to pallet 126 (not shown in FIGS. 8A/8B). The rack 124 may have structural members, walls, panels, or the like to define an enclosure that includes a main portion or enclosure 202 and an upper portion or enclosure 208. The rack 124 may also have an interior storage area 206. In the example shown in FIGS. 8A and 8B, a plurality of vertically extending support members, including front members 200*a* and rear members 200*b* (collectively, 200) extend from the base structure 198, forming one or more wall structures that define an enclosure comprising the main enclosure 202 and the upper enclosure 208. The main enclosure 202 and upper enclosure 208 may be separated by one or more horizontal members 214. Accordingly, the upper enclosure 208 is elevated relative to the base structure 198 and may be positioned directly above the main enclosure 202 as shown. The main enclosure 202 may generally define a space within which the housing 120, power generator 122, and other components of system 100 may be stowed. The rack 124 may also include a hinged structure 204 that defines at least in part the interior storage area 206. In the example illustrated in FIGS. 8A and 8B, the interior storage area 206 is positioned adjacent the rear plurality of support members 200*b* and/or the upper enclosure 208.

The hinged structure 204 may be defined by a plurality of elongated members 210 fixed together by one or more cross-members 211, thereby generally forming a wall structure or panel. The hinged structure 204 may be pivotally mounted to the support members 200 or other components of the rack 124 to facilitate access to the interior storage area 206. More specifically, access to the interior storage area 206 may be generally closed off when the hinged structure 204 is in a closed position as shown in FIGS. 8A and 8B. As will be described further below, the hinged structure 204 may be pivotally linked to the rack 124. In the example approach illustrated in FIGS. 8A and 8B, the hinged structure 204 is pivoted about a lower end 212 of the hinged structure 204, which is pivotally linked to lower support members 214 of the rack 124, to a lowered position. In the lowered position, the interior storage area 206 is generally opened, e.g., for stowing/removal of components of the system 100. It should be noted that the lower support members 214 may extend across the rack 124, generally separating the upper enclosure 206 and main enclosure 202, to respective end portions 215 that connect to the hinged structure 204. The end portions 215 may be connected to the hinged structure 204 at a different position on the rack 124 that is higher or lower than that illustrated in FIGS. 8A and 8B. For example, as will be seen in other illustrations herein, the hinged structure 204 may be pivotally connected to the rack 124 at a position below the upper enclosure 206 (see FIGS. 8C, 8D, 8E, 9A, 9B, and 9D). In any case, the lower support members 214 may extend generally horizontally across an upper boundary of the main enclosure 202. An upper end 218 of the hinged structure 204 may be secured to upper support members 216 of the rack 124 to maintain the hinged structure 204 in the closed position illustrated in FIGS. 8A and 8B.

Figure 8C:
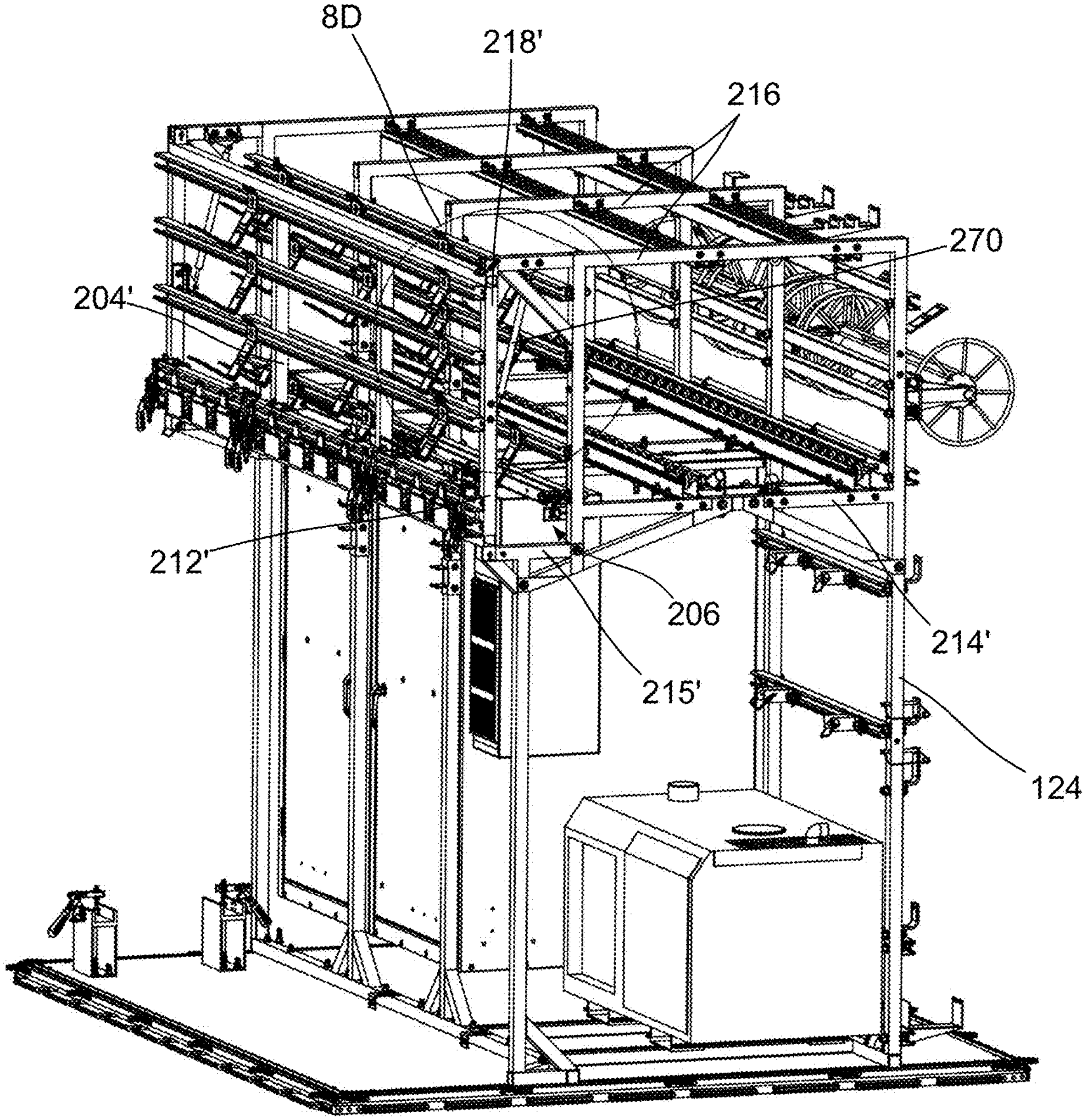
FIG. 8C shows a front perspective view of another storage/shipping rack for the system of FIGS. 1-7, with a hinged structure in a closed position, according to an example.
Figure 8D:
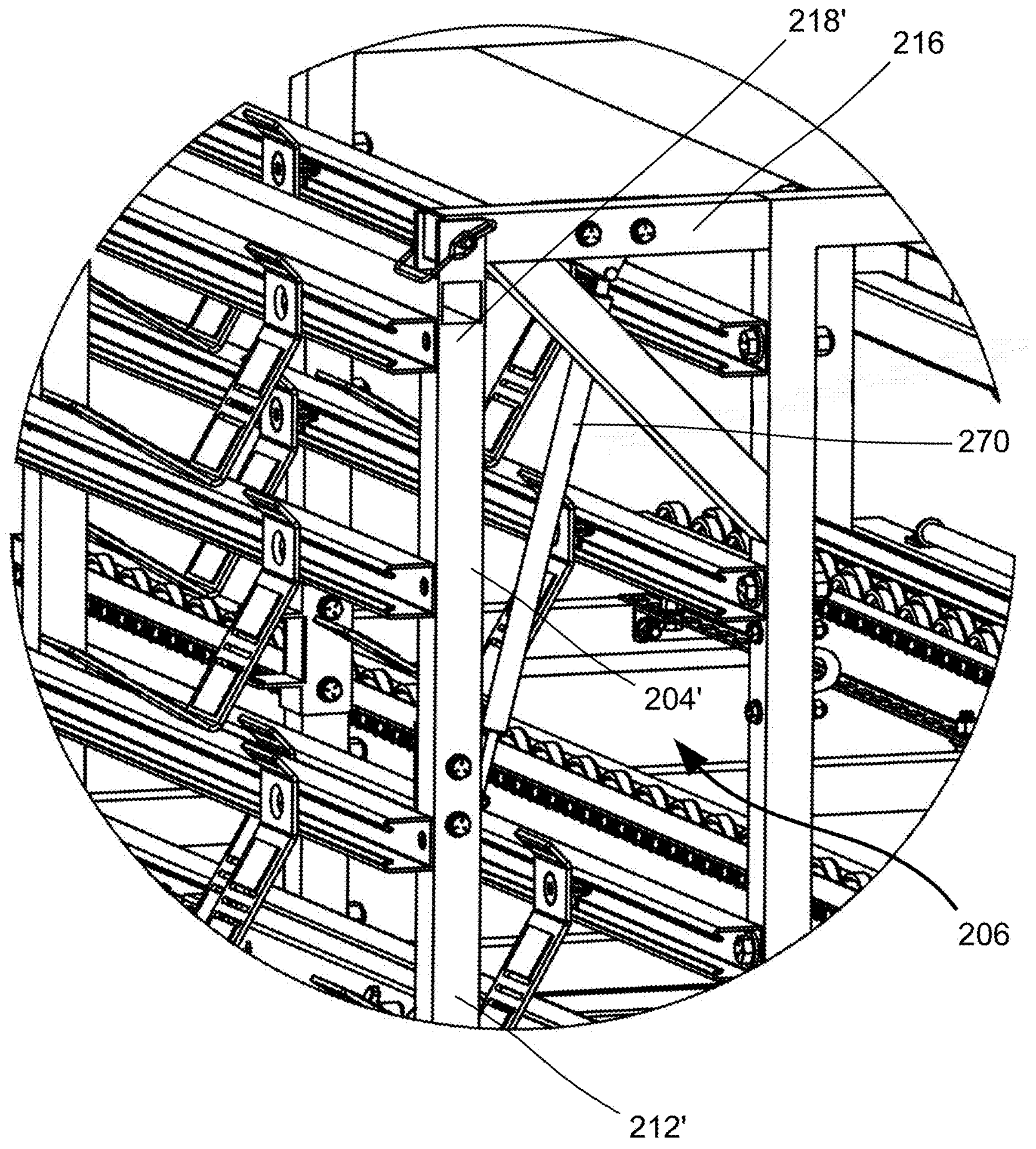
FIG. 8D shows an enlarged portion of FIG. 8C, according to one example.
Figure 8E:
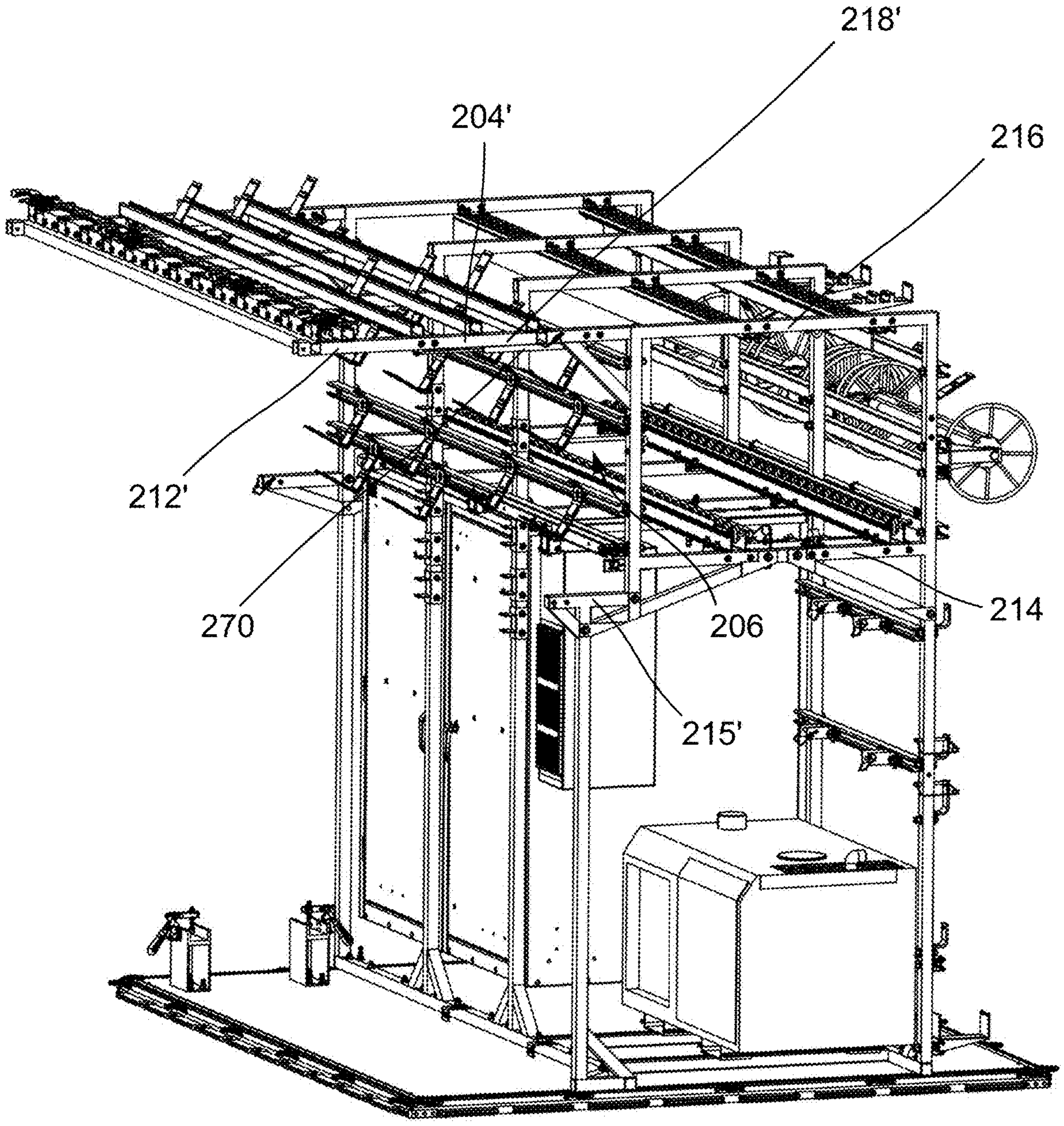
FIG. 8E shows a front perspective view of the storage/shipping rack of FIGS. 8A and 8B, with the hinged structure in an open position, according to an example illustration.

Another example hinged structure 204' is illustrated in FIGS. 8C-8E, with some components of the system 100 loaded onto the rack 124. In contrast to the hinged structure 204 illustrated in FIGS. 8A and 8B, the hinged structure 204' in FIGS. 8C-8E is pivotally linked to the rack 124 about an upper end 218' of the hinged structure 204'. Accordingly, the hinged structure 204' is pivoted about the upper end 218' of the hinged structure 204', which is pivotally linked to upper support members 216 of the rack 124, to a raised position. With the hinged structure 204' in the raised position (see FIG. 8E), the interior storage area 206 is generally opened, e.g., for stowing/removal of components of the system 100. The lower end 212' of the hinged structure 204' may be secured to end portions 215' of the rack 124 when the hinged structure 204 is in the lowered/closed position illustrated in FIGS. 8C and 8D. An assist mechanism 270 may be provided to facilitate a controlled raising and/or lowering of the hinged structure 204'. As best seen in FIG. 8D, the assist mechanism is an extendable gas spring secured at a first end thereof to upper support member 216 of the rack 124. A second end of the assist mechanism 270 opposite the first end is secured to the hinged structure 204', e.g., to the lower end 212' of the hinged structure 204'. The assist mechanism 270 may limit acceleration of the hinged structure 204' when pivoting, thereby preventing the hinged structure 204' from falling from the raised/opened position (see FIG. 8E) to the lowered/closed position (see FIGS. 8C and 8D). The assist mechanism 270 may also be biased such that it tends to expand lengthwise, thereby applying an assisting force when the hinged structure 204' is raised from the lowered/closed position to the raised/opened position. The assist mechanism 270 may also maintain the hinged structure 204' in a raised/opened position (e.g., as shown in FIG. 8E), thereby facilitating stowage/removal of items within the interior storage area 206.

As will be discussed further below, the main enclosure 202, interior storage area 206/206', and upper enclosure 208 of the rack 124 may each be configured for stowing certain components of the system 100. Additionally, the vertically extending support members 200 may allow for securing certain components of the system 100 for transport and/or storage on the rack 124, e.g., by way of tie-downs, cables, or the like.

Turning now to FIGS. 9A-9E, the system 100 is illustrated stowed upon the rack 124. The positioning of the various components of system 100 illustrated is merely an example, and other configurations or strategies for stowing the various DILS components may be employed. In the example illustrated in FIGS. 9A-9E, the housing 120 and power generator 122 are positioned within the main enclosure 202. With the system 100 stowed on the rack 124, the housing 120 and control electronics contained therein may still be accessible to any extent mounted components of the system 100 do not obstruct access through doors or other openings of the housing 120. The horizontally extending upper structure 208 may include transit cases 188, as well as pivot assembly 190. The tower sections 114*a*, 114*b*, 114*c*, as well as an uppermost antenna section 118*a*, may be positioned on the front vertically extending members 200*a*. Additional transit cases 188, as well as reel 192*a*, may be positioned upon the pallet 126 adjacent the rear vertically extending support members 200*b*. Remote antennas 148 may be positioned within the interior storage area 206 of the hinged structure 204. The lower three main antenna sections 118*b*, 118*c*, and 118*d* may be positioned on the members 210/211 of the hinged structure 204, along with the vertical legs 194. The transit cases 188 may stow various smaller components of the system 100. Further, straps, cables, or other retention devices (not shown in FIGS. 9A-9E) may be used to secure the rack 124, components of the system 100, etc. to the pallet 126. In the illustrated examples, brackets, pins, hinged parts, and/or latches may be used to secure components of the system 100 to the rack 124 and/or the pallet 126. Accordingly, all components of the system that are required to deploy the system 100 can generally be packed and removed from the pallet 124 without the use of tools of any kind.

Figure 9A:
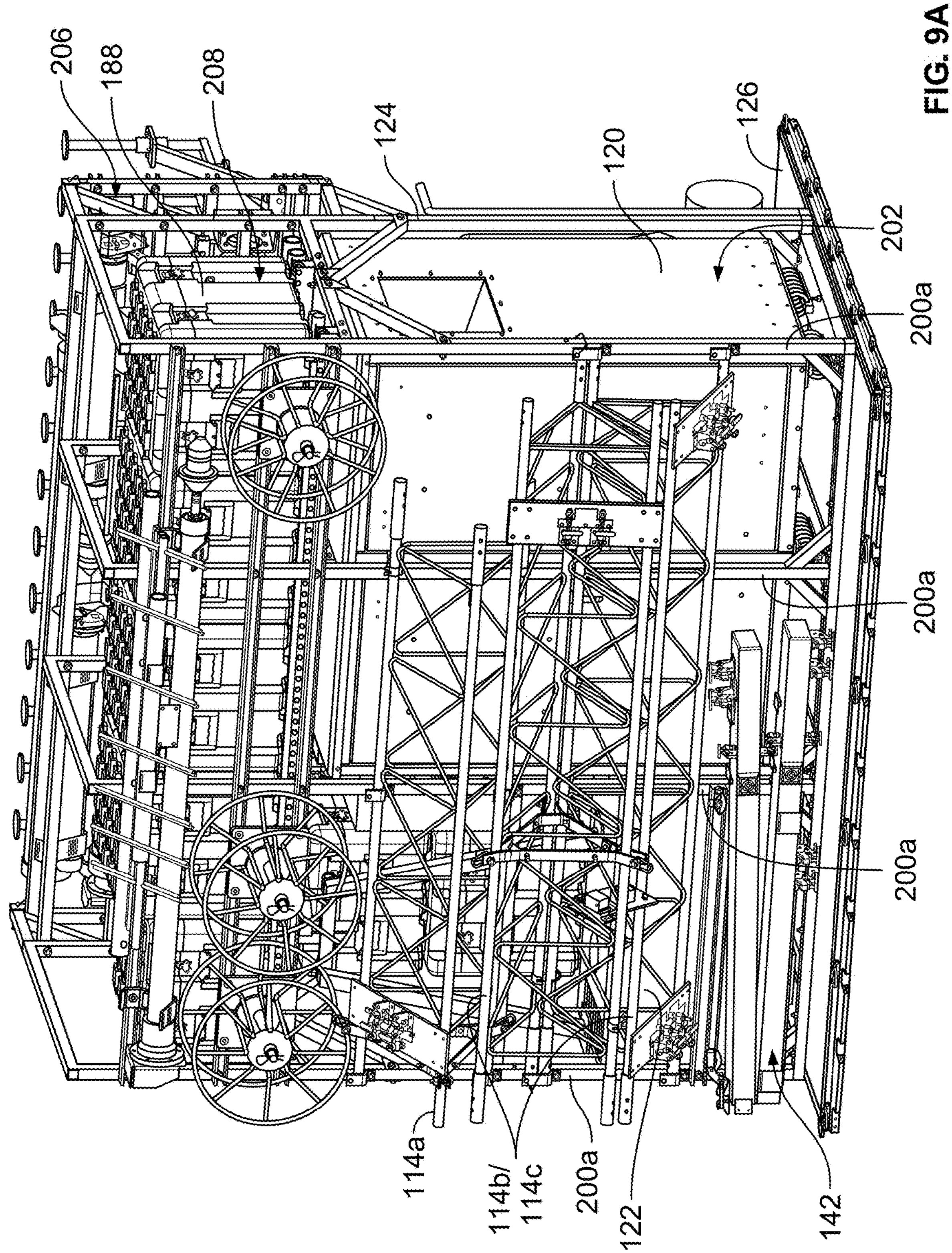
FIG. 9A shows a front perspective view of the system of FIG. 1 in a disassembled state and stowed on a storage rack for transport, according to one example approach.
Figure 9B:
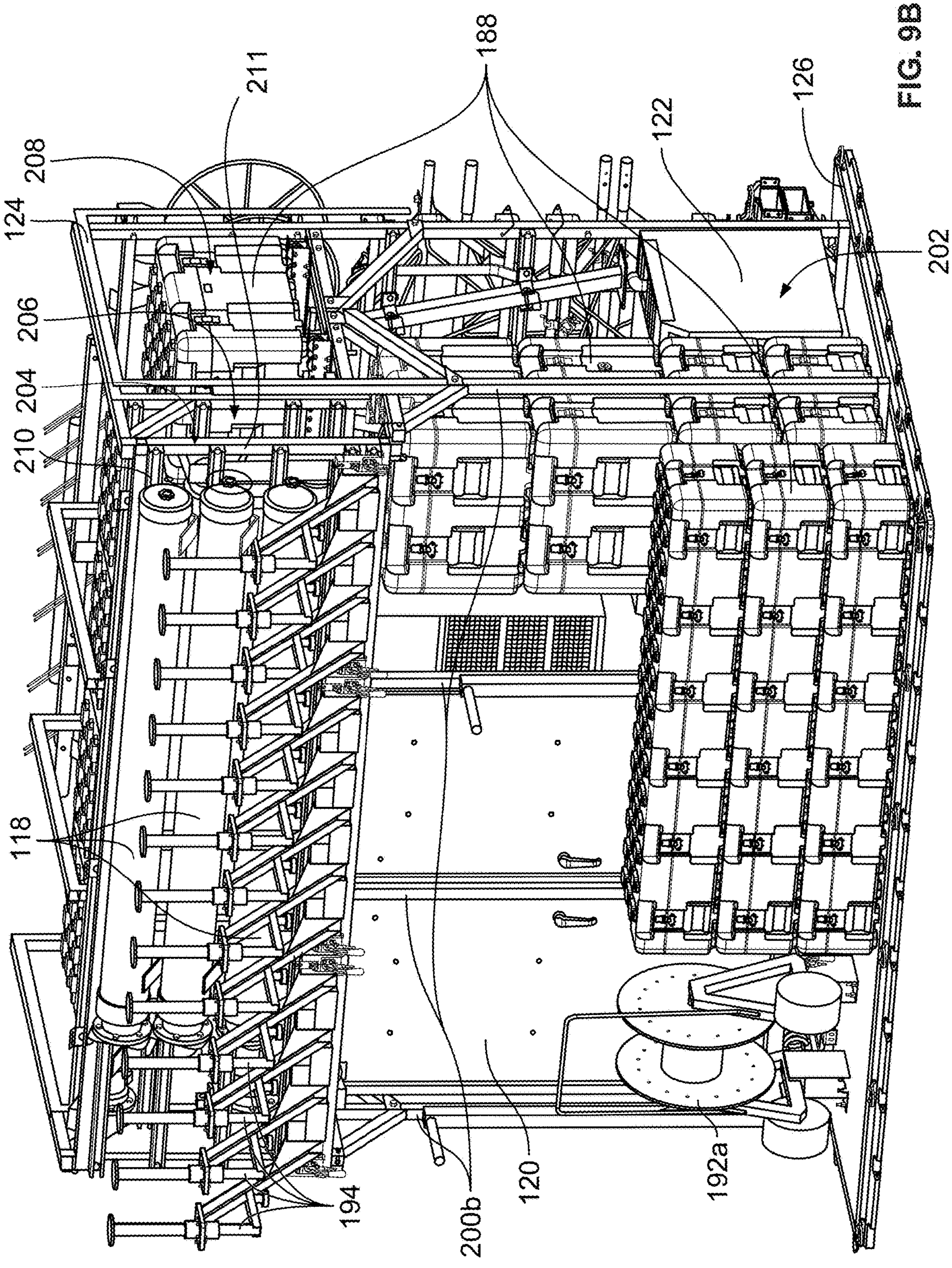
FIG. 9B shows a rear perspective view of the disassembled and rack-mounted system of FIGS. 1 and 9A, according to one example.
Figure 9C:
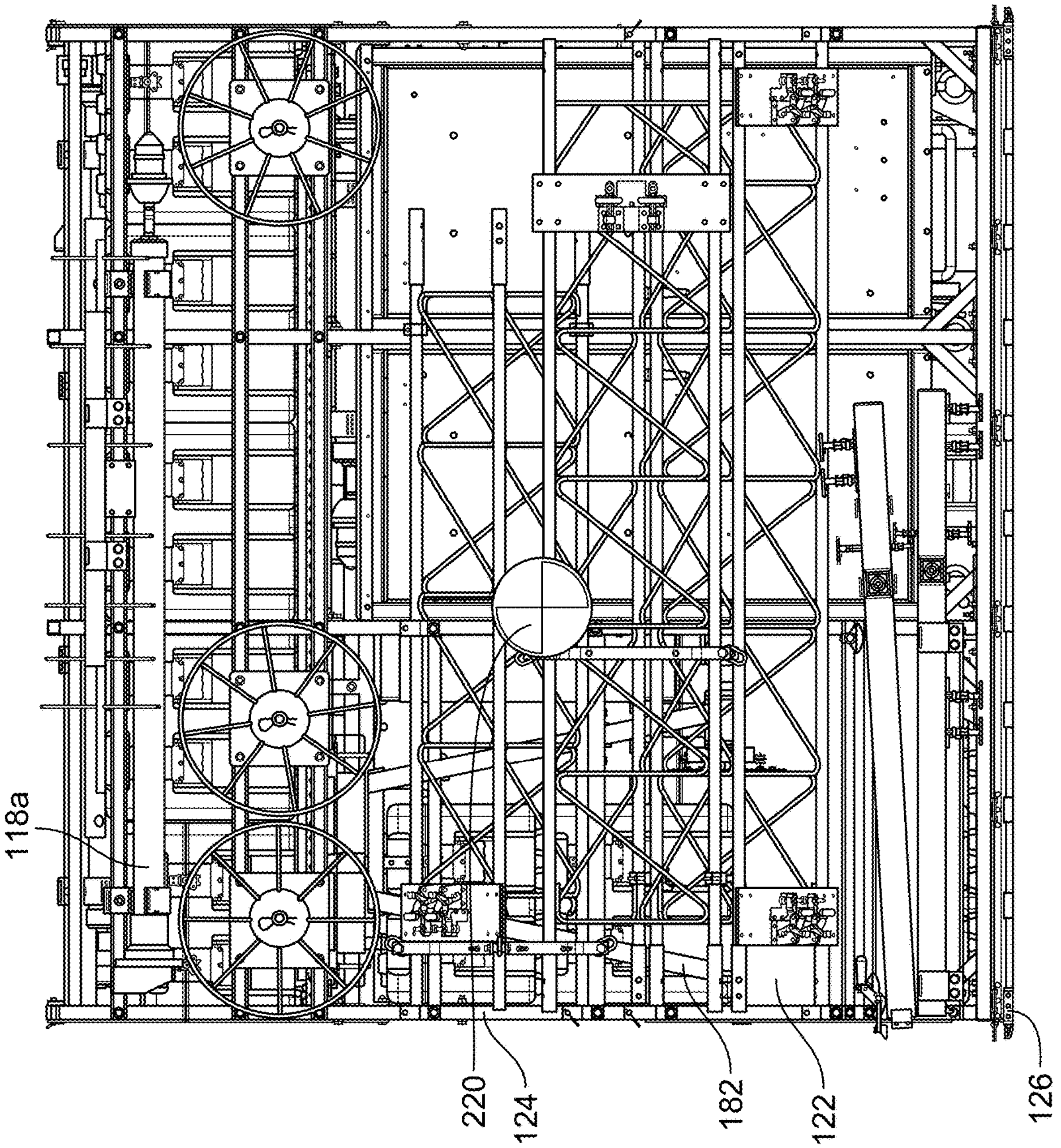
FIG. 9C shows a front view of the disassembled and rack-mounted system of FIGS. 1, 9A, and 9B, according to an example.
Figure 9D:
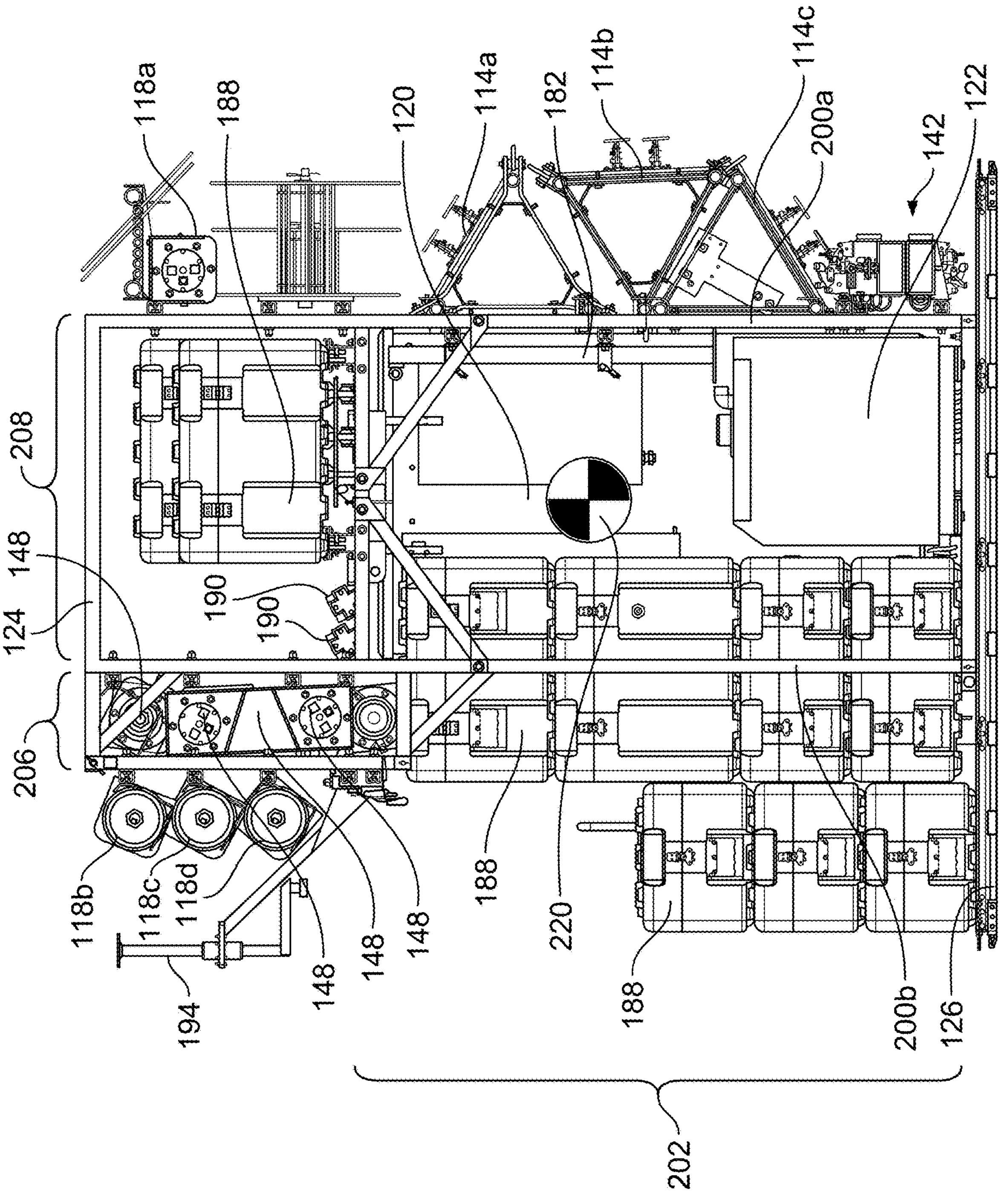
FIG. 9D shows a left view of the disassembled and rack-mounted system of FIGS. 1 and 9A-9C, according to an example illustration.
Figure 9E:
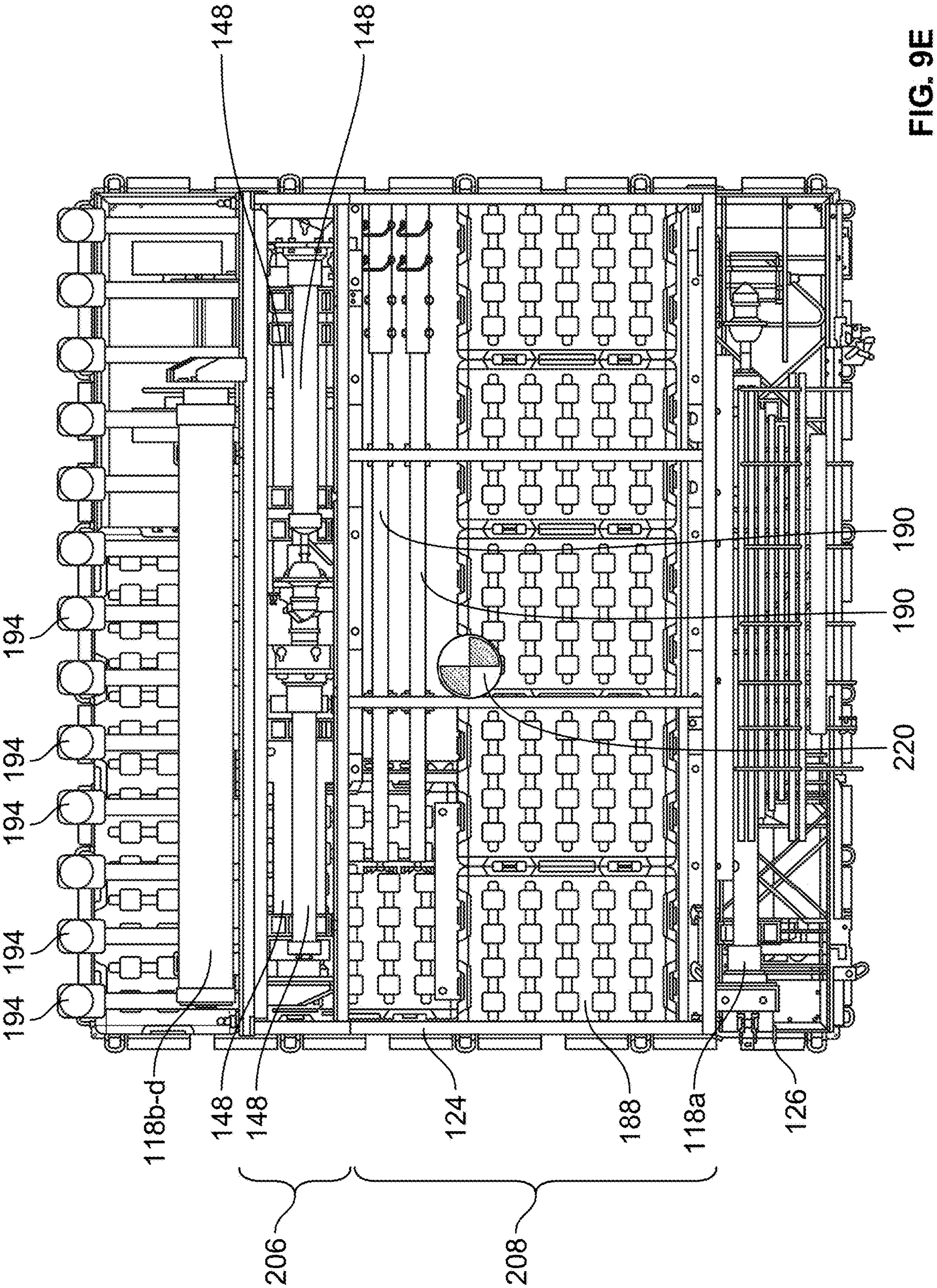
FIG. 9E shows a top view of the disassembled and rack-mounted system of FIGS. 1 and 9A-9D, according to one example.

A center of gravity 220 of the stowed system 100 on the rack 124 and pallet 126 is illustrated in FIGS. 9C-9E for the loaded configuration of the system 100 shown. Generally, the center of gravity 220 of the stowed system 100 may be altered by repositioning components on the rack 124. The location of the center of gravity 220 of the stowed system 100 may be a design consideration for an air drop of the stowed system 100, for example.

Turning now to FIGS. 10A-10E, unpacking components of system 100 from the rack 124 and pallet 126 will be described in further detail. Initially, a preliminary site survey may be performed, e.g., to determine appropriate orientation of the runway centerline 110 and runway threshold 112, positioning of components of the system 100, etc. Upon delivery of the system 100 to the designated area, the various components of the system 100 may be unpacked from the rack 124. Cables, e.g., communication links between base station 108 and remote antenna assemblies 102, 104, and/or 106, may be rolled out to the appropriate locations. The remote antenna assemblies 102, 104, 106, and base station 108 may be positioned as determined to be appropriate and assembled.

Figure 10A:
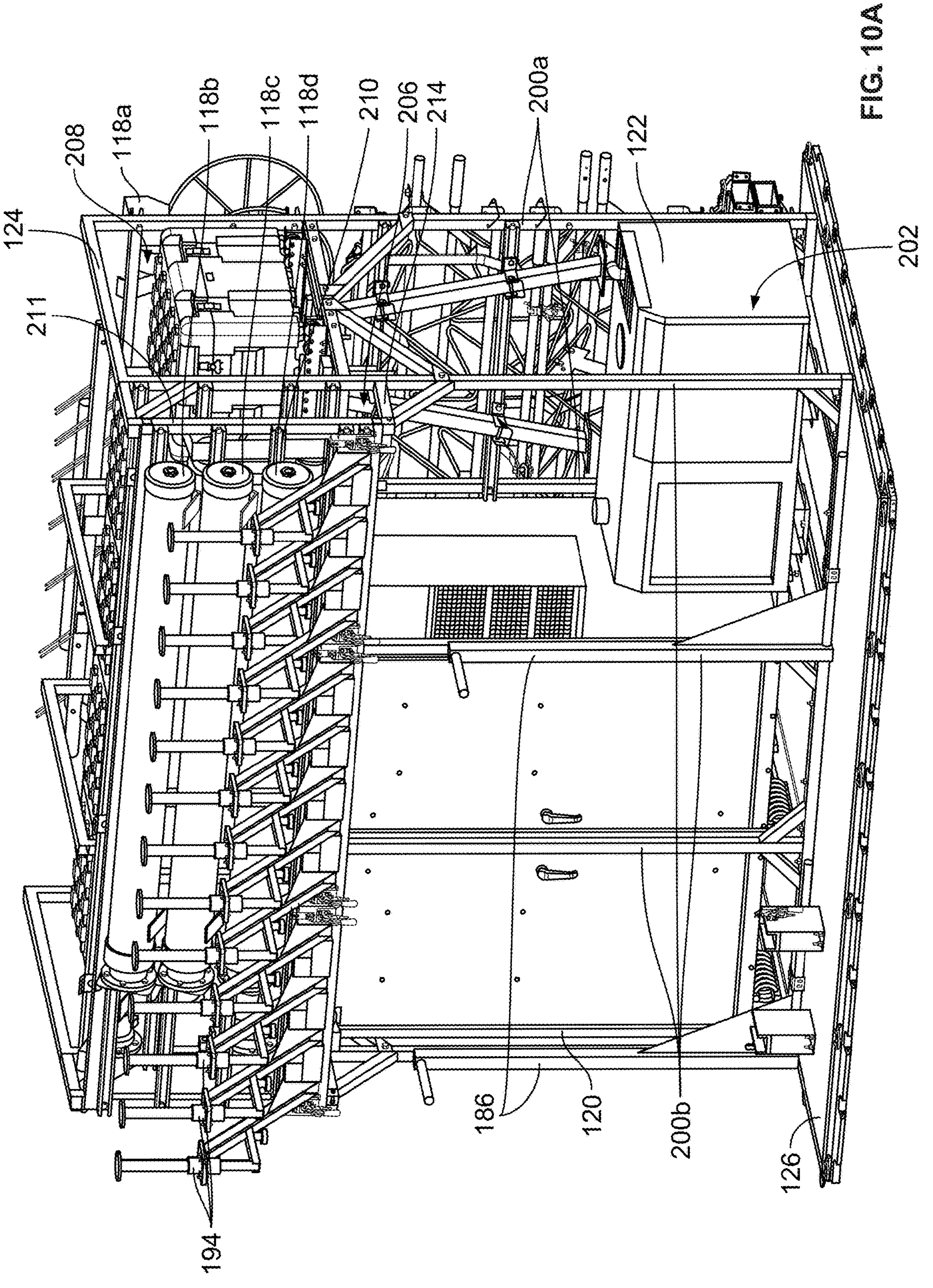
FIG. 10A shows a rear perspective view of the rack of FIGS. 8A-9E with a first group of components of the disassembled system removed, and a hinged structure of the rack in an up/closed position, according to one example.

Referring now to FIG. 10A, a rear perspective view of the rack of FIGS. 8A-9E with a first group of components of the disassembled system 100 removed is illustrated. The hinged structure 204 of the rack 124 may, at this stage of unpacking the system 100, remain in a closed position. A first group of components of the system 100 may be removed, including the transit cases 188 positioned on the pallet 126, and the cable reel 192*a* (see FIG. 9B). In an example, the reel 192*a* includes cable for communication/power between the base station 108 (upon assembly) and the remote antenna assembly 104*a*. Accordingly, the main antenna sections 118*b-d*, support arms 186, and vertical legs 194 may be removed from the rack 124.

Figure 10B:
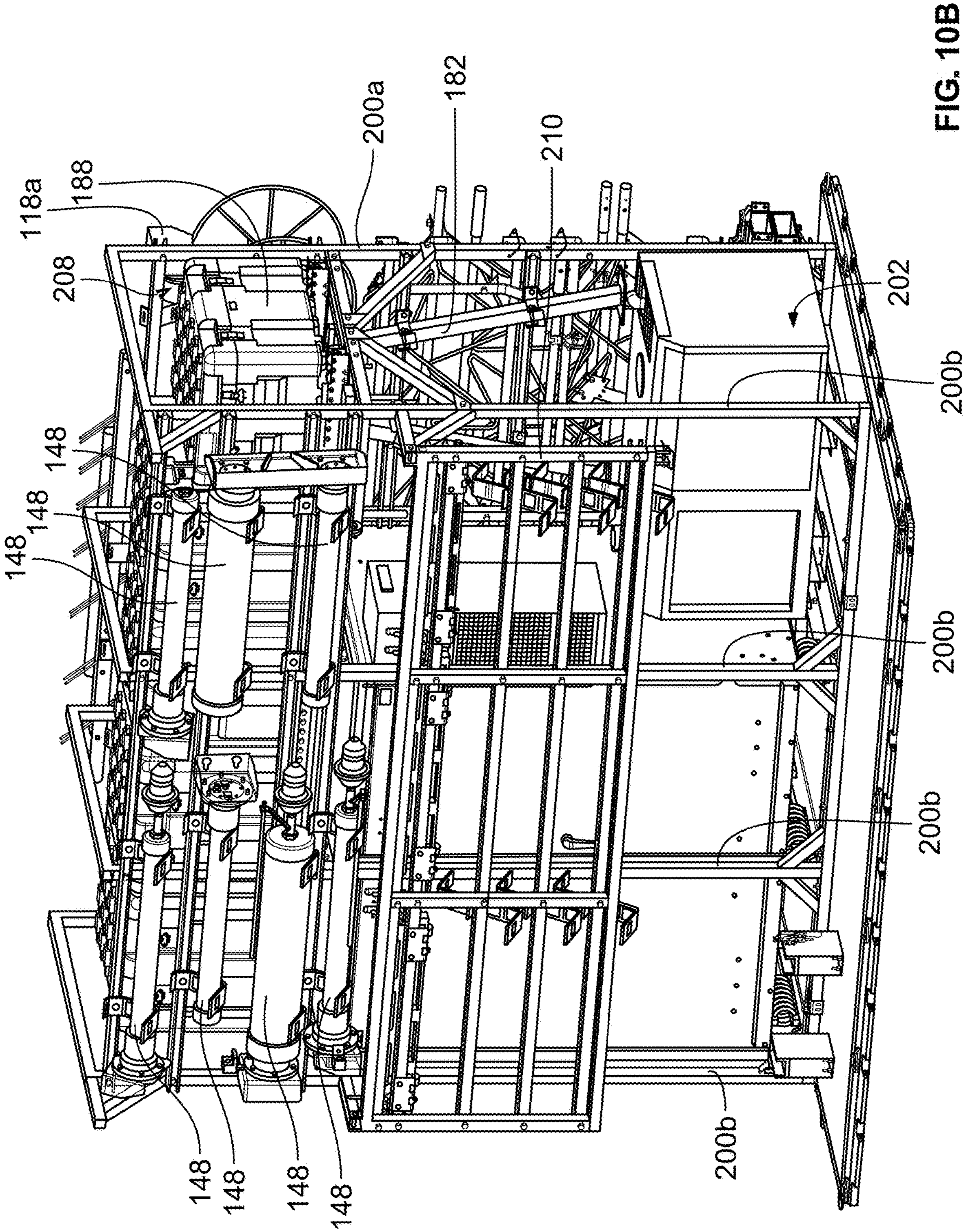
FIG. 10B shows a rear perspective view of the rack of FIGS. 8A-9E and 10A with a second group of components of the disassembled system removed, and the hinged structure of the rack in a down/open position, according to one example.

Proceeding to FIG. 10B, a rear perspective view of the rack 124 with a second group of components of the disassembled system 100 removed is shown. Additionally, the hinged structure 204 has been pivoted to an opened position, in which access to the interior storage area 206 is generally permitted. While the hinged structure 204 is shown in a lowered position, i.e., the hinged structure 204 pivots about a lower end thereof, it should be noted that the hinged structure 204 may alternatively pivot about an upper end thereof, e.g., as described above in FIGS. 8C-8E. Accordingly, the remote antennas 148 for each of the remote antenna assemblies 102, 104, 106 may be removed.

Figure 10C:
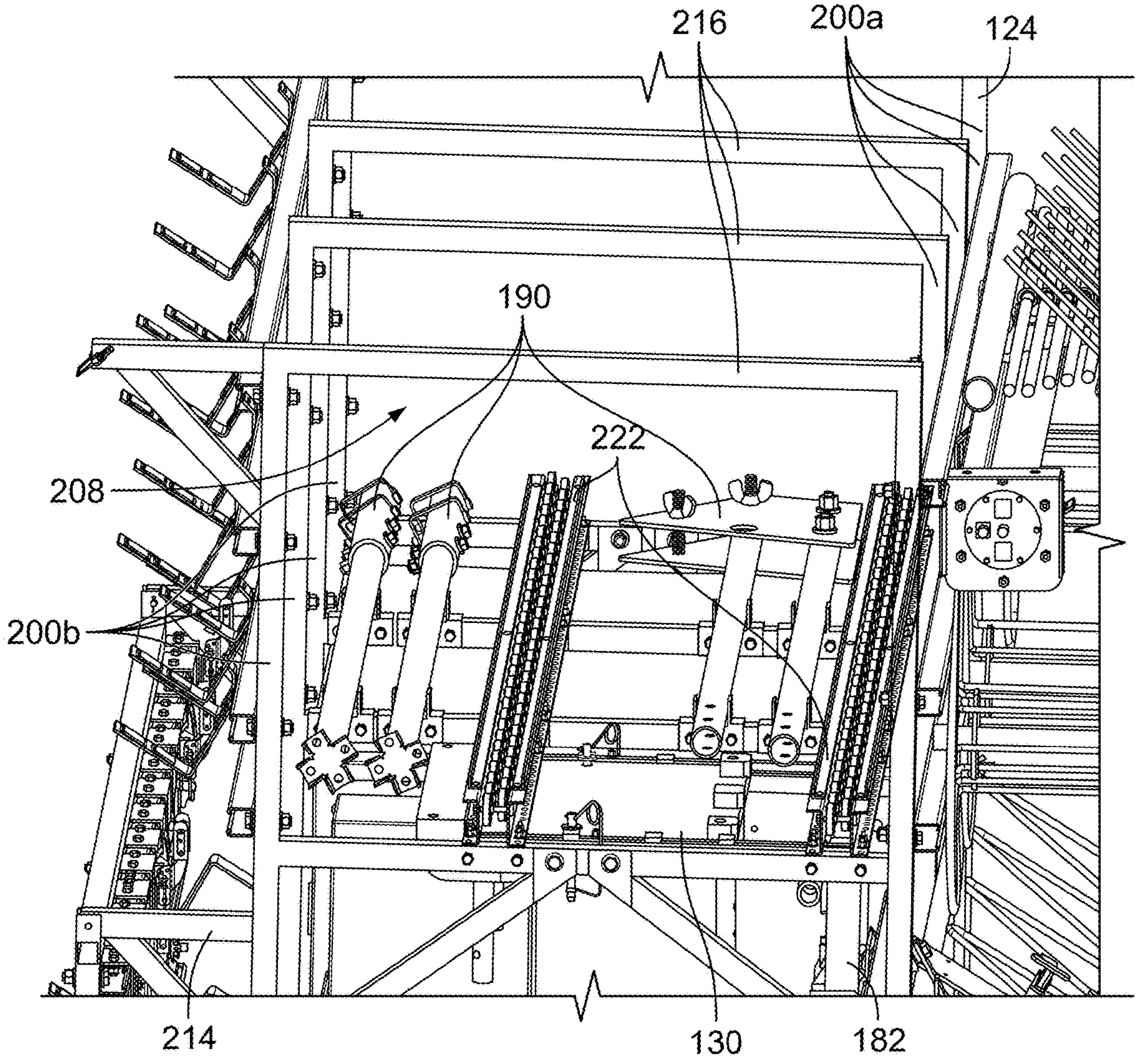
FIG. 10C shows an upper left perspective view of the rack of FIGS. 8A-9E, 10A, and 10B with a third group of components of the disassembled system removed to illustrate a horizontally moveable track of the rack, according to an example approach.

Turning now to FIG. 10C, removal of a third group of components of the disassembled system 100 from the rack 124 will be described. More specifically, additional transit cases 188 (see FIGS. 10A-10B) have been removed from the upper enclosure 208. The transit cases 188 may be removed from the area 208 by sliding a horizontally moveable track 222 beneath the transit cases 188 (not shown in FIG. 10C) out of the area 208, facilitating access to the transit cases 188 and their contents. In some examples, the rack 124 may have one or more guides (not shown), stops, or the like to generally maintain the transit cases 188 in a stationary location on the rack 124 during transit. Further, the rack 124 may have a rope/pulley (not shown) or other mechanism for sliding the transit cases 188 out of the upper enclosure 208 or otherwise into a position on the rack 124 where the transit cases 188 may be reached by personnel deploying the system 100 for removal from the rack 124. With the transit cases 188 removed, as can be seen in FIG. 10C, the pivot assembly 190 may also be removed. As can also be seen in FIG. 10C, the pivot assembly 190 is disassembled into three separate components, which will be discussed further below in connection with the use of the pivot 190 in the raising of the ground tower 116 (not shown in FIG. 10C). As is also shown in FIG. 10C, the base 130 may be stowed on the rack 124 along the lower portion of the upper enclosure 208 (and underneath the removed transit cases 188). The stand 182 may also be removed from the rack 124. As best seen in FIG. 10B, the stand 182 may be hung or otherwise secured to the front vertically extending support members 200*a* when stowed on the rack 124.

Figure 10D:
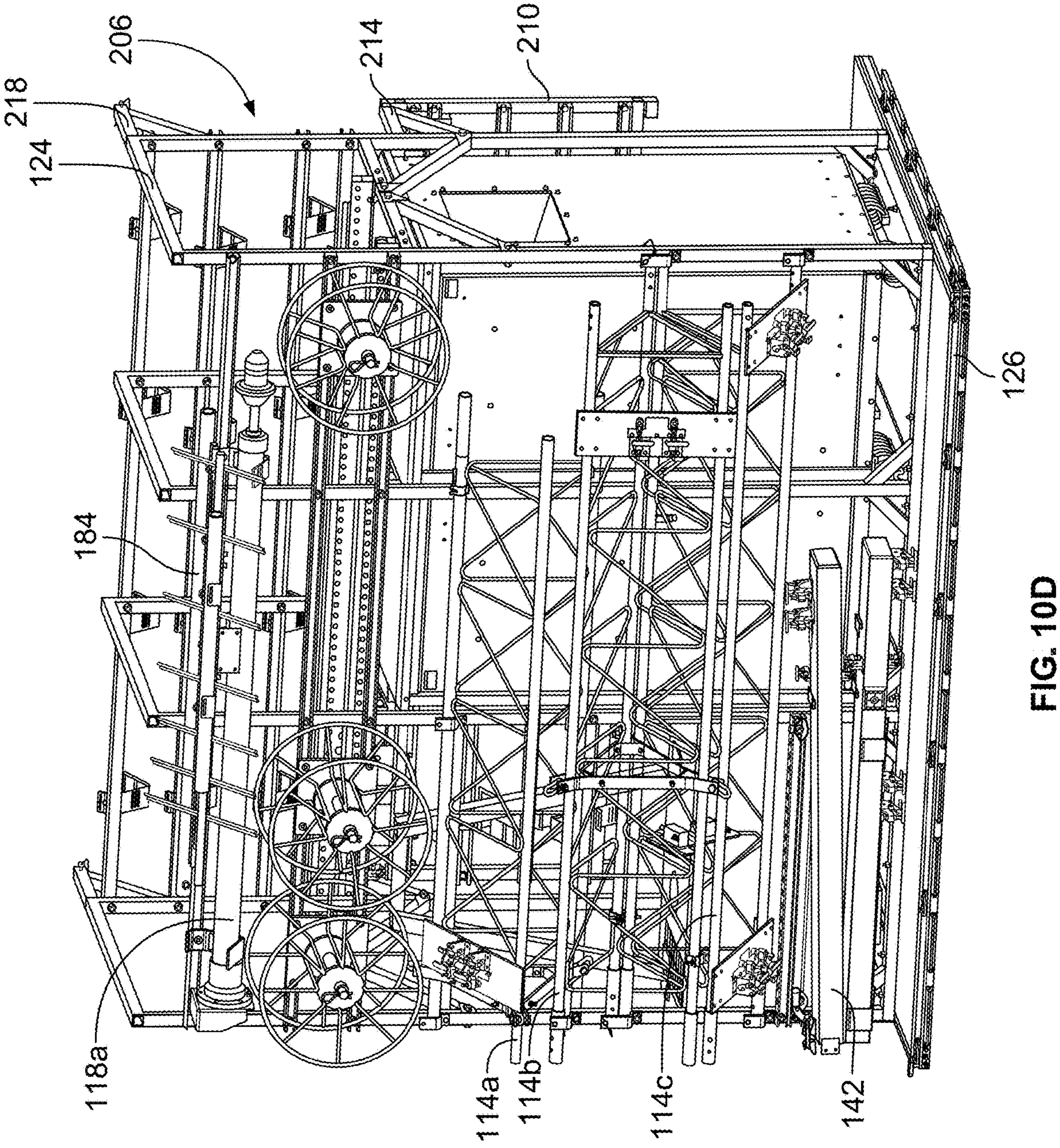
FIG. 10D shows a front perspective view of the rack of FIGS. 8A-9E and 10A-10C, with a fourth group of components of the disassembled system removed, and the hinged structure of the rack in the down/open position, according to an example.
Figure 10E:
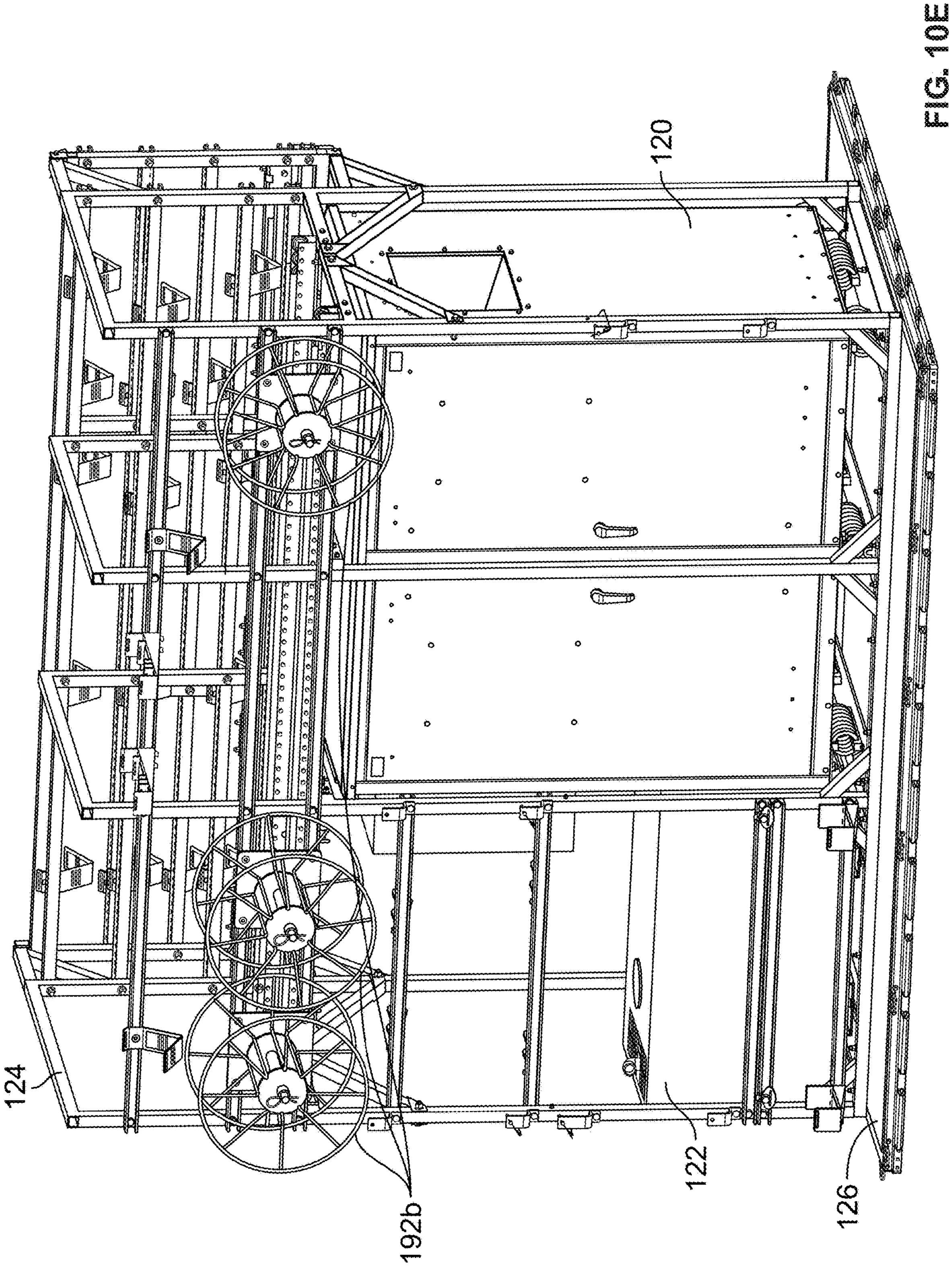
FIG. 10E shows a front perspective view of the rack of FIGS. 8A-9E and 10A-10D with a fifth group of components of the disassembled system removed, and the hinged structure of the rack in the up/closed position, according to one example illustration.

Referring now to FIGS. 10B and 10D, the removal of a fourth group of components of the disassembled system 100 from the rack 124 will be described in further detail. The hinged structure 204 in each of FIGS. 10B and 10D is illustrated in an open position, allowing access to components of the system 100 stowed in the interior storage area 206. Accordingly, the remote antennas 148 may be removed from the interior storage area 206. Additionally, the tower sections 114*a*, 114*b*, and 114*c* may be removed from the rack 124, as well as the uppermost main antenna section 118*a*, and the beam 142 of the remote antenna assembly 102. Further, the laterally extending antenna(s) 184 may also be removed from the rack 124, as best seen in FIG. 10D. Referring now to FIG. 10E, the removal of all components of the system 100 apart from the housing 120 and power generator 122 is shown. Accordingly, the control electronics within the housing 120 and power generator 122 are generally positioned within the rack 124 for use as part of the base station 108.

Figure 11:
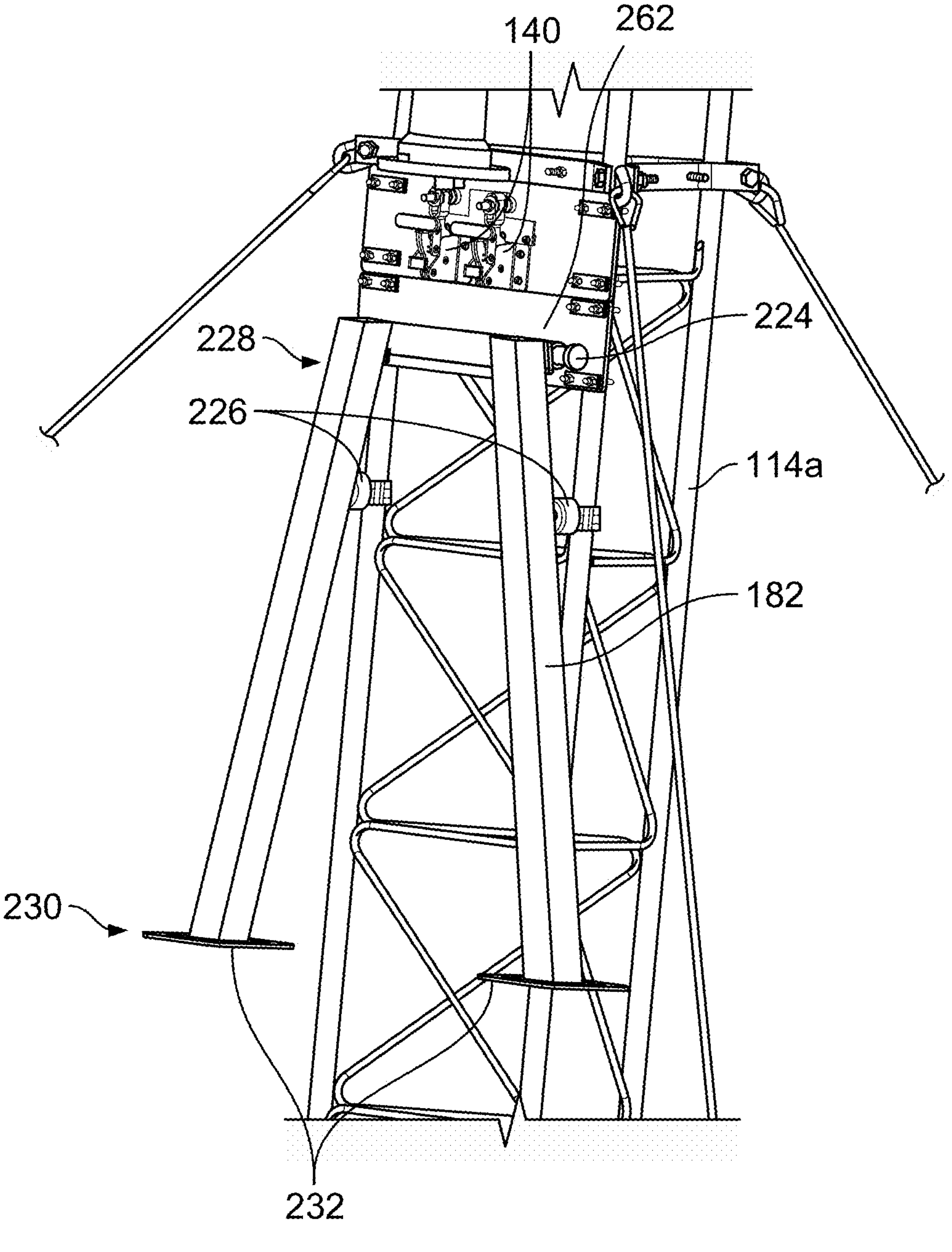
FIG. 11 shows a perspective view of one of the tower sections in an operational position and a kickstand of the tower section in a stowed position, according to an example.

Turning now to FIG. 11, the stand 182 is illustrated and described in further detail. The stand 182 is shown attached to tower section 114*a* upon raising of the ground tower 116 to an operational or substantially vertical position (see FIG. 2). The stand 182 is in a retracted or stowed position, generally aligned against the tower section 114*a*. More specifically, the stand 182 is pivotally secured to the tower section 114*a* by way of a pivot pin 224, which links the stand to a pivot base 262. The pivot base 262 may be bolted to the tower section 114*a*, or otherwise semi-permanently installed to the tower section 114*a*. Accordingly, the stand 182 may be installed to the tower section 114*a* by aligning with the pivot base 262 and inserting the pivot pin 224 as shown. The pivot pin 224 may be inserted adjacent a first or upper end 228 of the stand 182. At an opposite or lower end 230 of the stand 182, a pair of ground-engaging feet 232 may be positioned for supporting the stand 182 upon a ground surface during assembly of the ground tower 116, as will be described further below. The stand 182 may be formed of a magnetically susceptible material, e.g., steel or the like. Additionally, one or more stand engagement features 226 may be provided on the tower section 114*a* or, for that matter, any other tower section convenient, for retaining the stand 182 when the ground tower 116 is raised in the operational position illustrated in FIG. 11. The stand engagement features 226 may, for example, be magnets configured to hold the lower end 230 generally against the tower section 114*a*, thereby preventing movement of the stand 182, e.g., swinging about the pivot pin 224 in response to wind, etc.

Figure 12A:
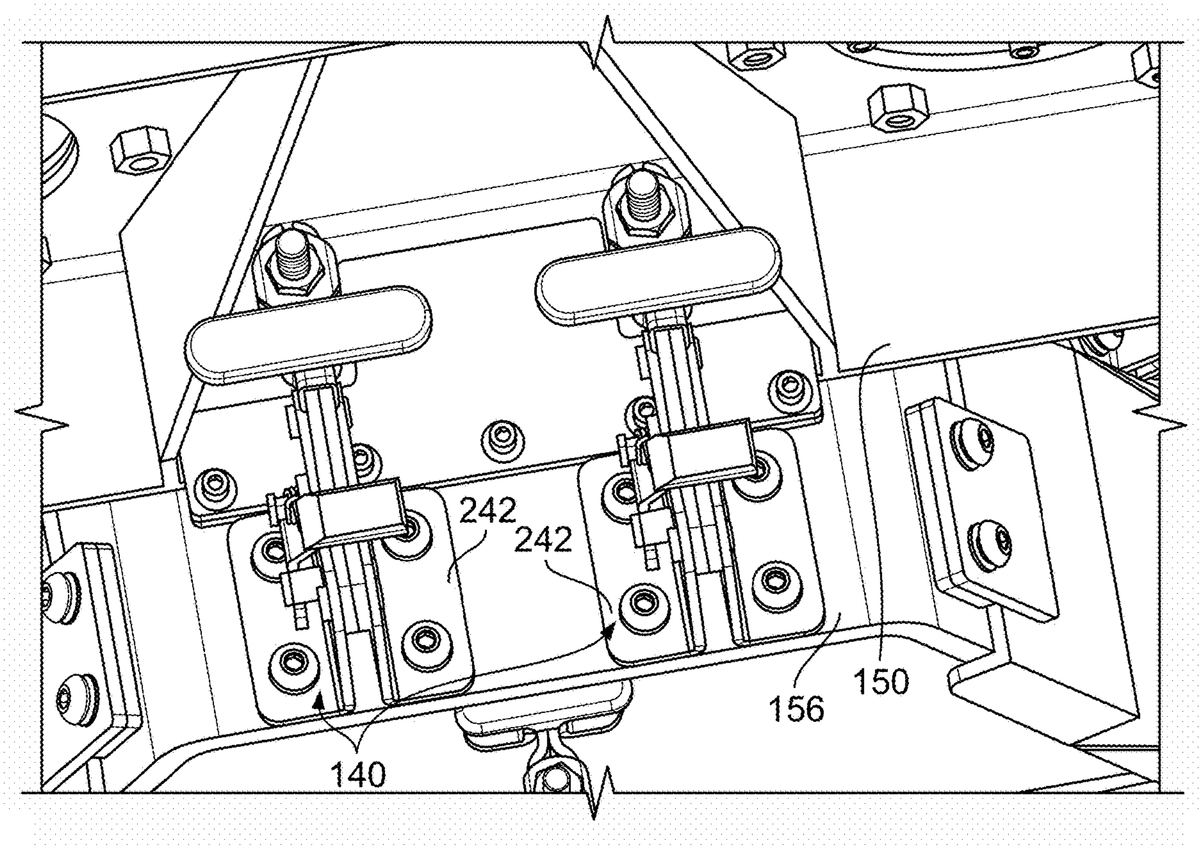
FIG. 12A shows a perspective view of a toggle latch for the system of FIGS. 1-11, e.g., as may be used in connection with antenna assemblies or the ground tower, according to one example approach.
Figure 12B:
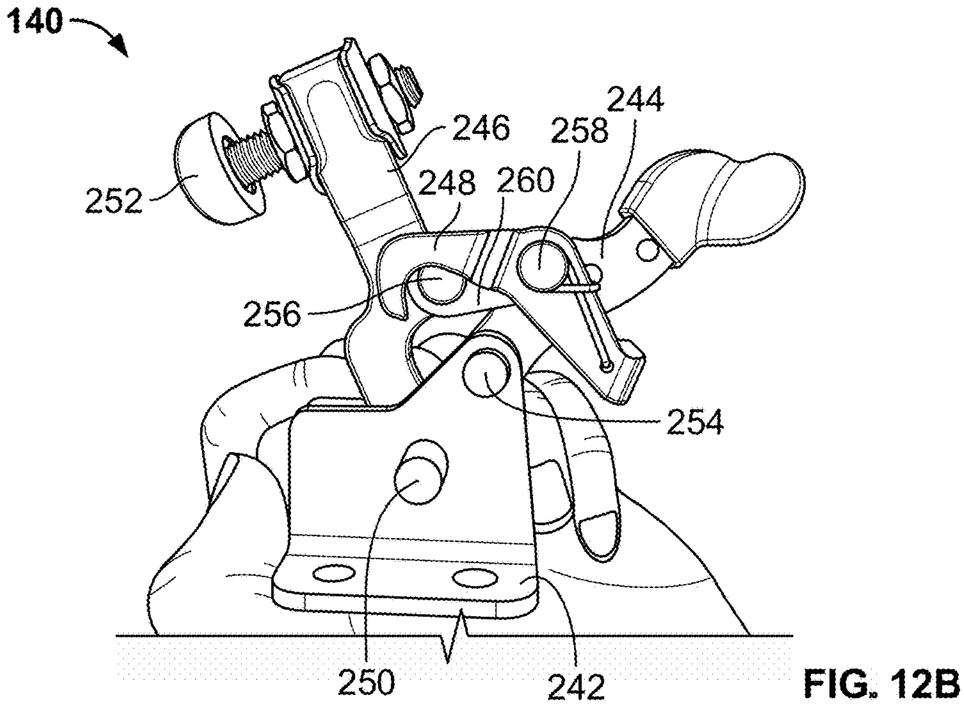
FIG. 12B shows a side view of the toggle latch of FIG. 12A in an open or unlatched position.
Figure 12C:
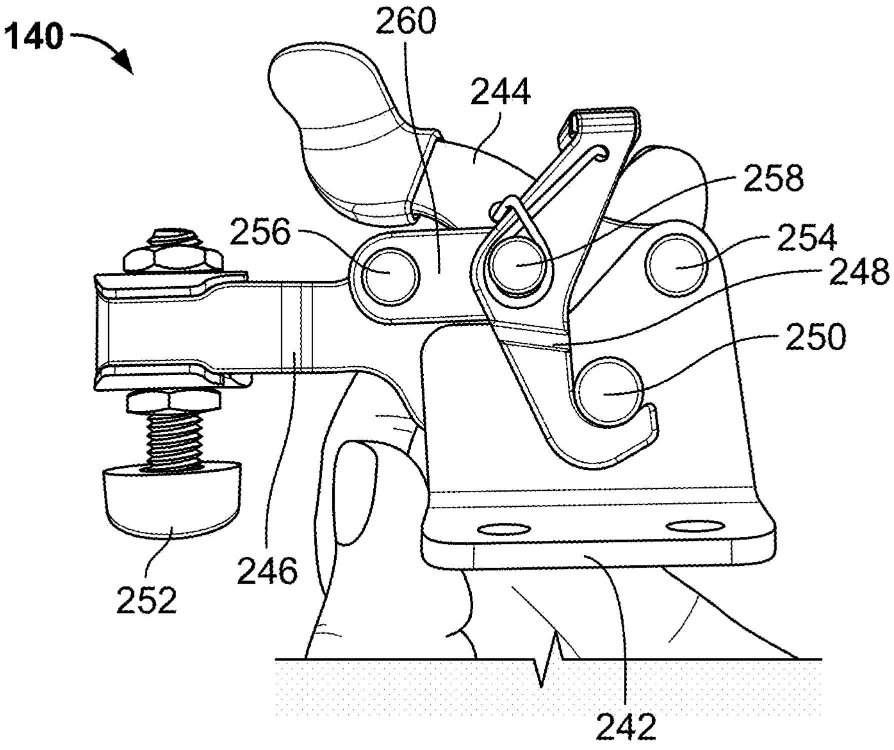
FIG. 12C shows a side view of the toggle latch of FIG. 12A in a closed or latched position.

Turning now to FIGS. 12A-12C, operation of latches 140 will be described in further detail. The latches 140 may be employed throughout the system 100 generally to reduce or eliminate the need for tools, reduce time needed to assemble the system 100 or components thereof. Merely as one example, in FIG. 12A a pair of latches 140 are used to clamp antenna base 150 to the body 156 of remote antenna assembly 104 (see FIG. 4). The latches 140 may be used on other antenna assemblies 102 or 106, or the ground tower 108, merely as examples. The latches 140 may each have a foot portion 242 that may be semi-permanently attached, e.g., to the body 156, with the latch 140 clamping a second component to the body 156. More specifically, as seen in FIG. 12A, the latch 140 clamps the antenna base 150 against the body 156. Accordingly, the antenna base 150 may be secured to the body 156 by hand, and generally without needing tools or other equipment.

Turning now to FIGS. 12B and 12C, the operation of latches 140 are described in further detail. More specifically, a latch 140 is illustrated in an unclamped or open position in FIG. 12B. The latch 140 may have a lever arm 244 that may be rotated about a pivot pin 254, thereby moving a clamp 252 toward a location adjacent the base portion 242, and into a closed or clamped position illustrated in FIG. 12C. The lever arm 244 may be connected to a clamp arm 246 via a link 260. The link 260 may be pivotally linked at a first end to the lever arm 244 at a first link pivot 258, and also pivotally linked at a second end to the clamp arm 246 at a second link pivot 256. The clamp arm 246 carries the clamp 252 and is pivotally linked to the base 242 by a clamp pivot pin 250. Accordingly, movement of the lever arm 244 toward the clamp 252 moves the clamp 252 toward the closed/clamped position illustrated in FIG. 12C. A lock arm 248 is also pivotally carried by the second link pivot 258 and may be rotated when the clamp 252 is in the closed/clamped position such that the end of the lock arm opposite the second link pivot 258 engages the clamp pivot pin 250. The clamp 252 may comprise an elastic material that applies a force to the object being clamped. This force can be at least partially resisted by lock arm 248, which tends to keep the lock arm 248 locked to the clamp pivot pin 250. Further, a position of the clamp 252 with respect to the clamp arm 246 can be adjusted if needed to vary the applied force, e.g., via a threaded connection of the clamp to the clamp arm 246. The lock arm 248 thereby generally prevents movement of the clamp 252 out of the closed/clamped position unless the lock arm 248 is rotated away from the clamp pivot pin 250. Generally, the base 242 of a latch 140 may be bolted or otherwise permanently or semi-permanently fixed to one component of the system 100 (e.g., body 156), and then engaged by hand with a second component (e.g., antenna base 150). Accordingly, the two components may be secured together by hand, and without requiring additional tools at the landing field to which the system 100 is being deployed. The use of the latches 140 throughout the system 100 may thus reduce overall weight of the system 100 to the extent such tools do not need to be shipped with the system 100. Moreover, setup time of the system 100 may also be reduced to the extent the latches 140 may clamp components together more quickly than a nut/bolt or other fastener.

Figure 13A:
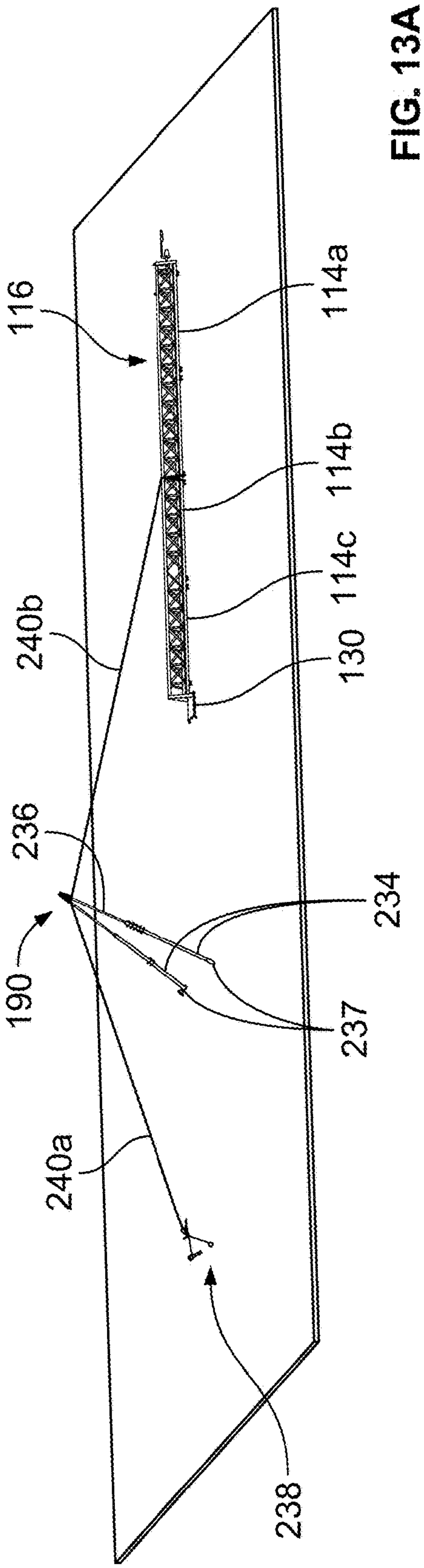
FIG. 13A shows an assembled ground tower in a lowered position on the ground, with a separate pivot positioned for lifting the ground tower, according to one example.
Figure 13B:
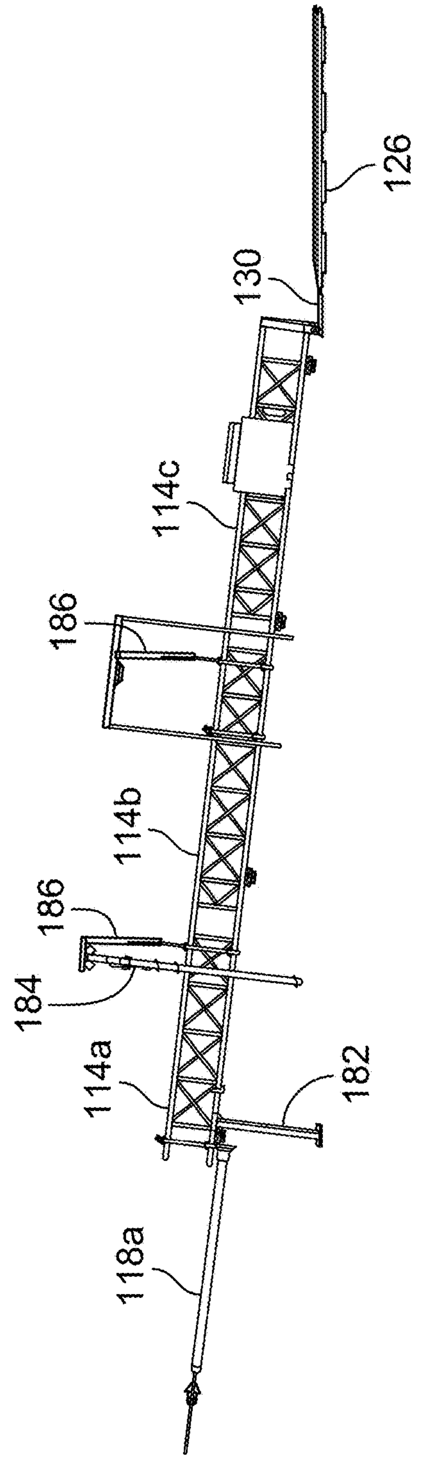
FIG. 13B shows the assembled ground tower of FIG. 13A raised from the ground to an assembly orientation, with an end of the tower supported on the kickstand of FIG. 11, according to an example.
Figure 13C:
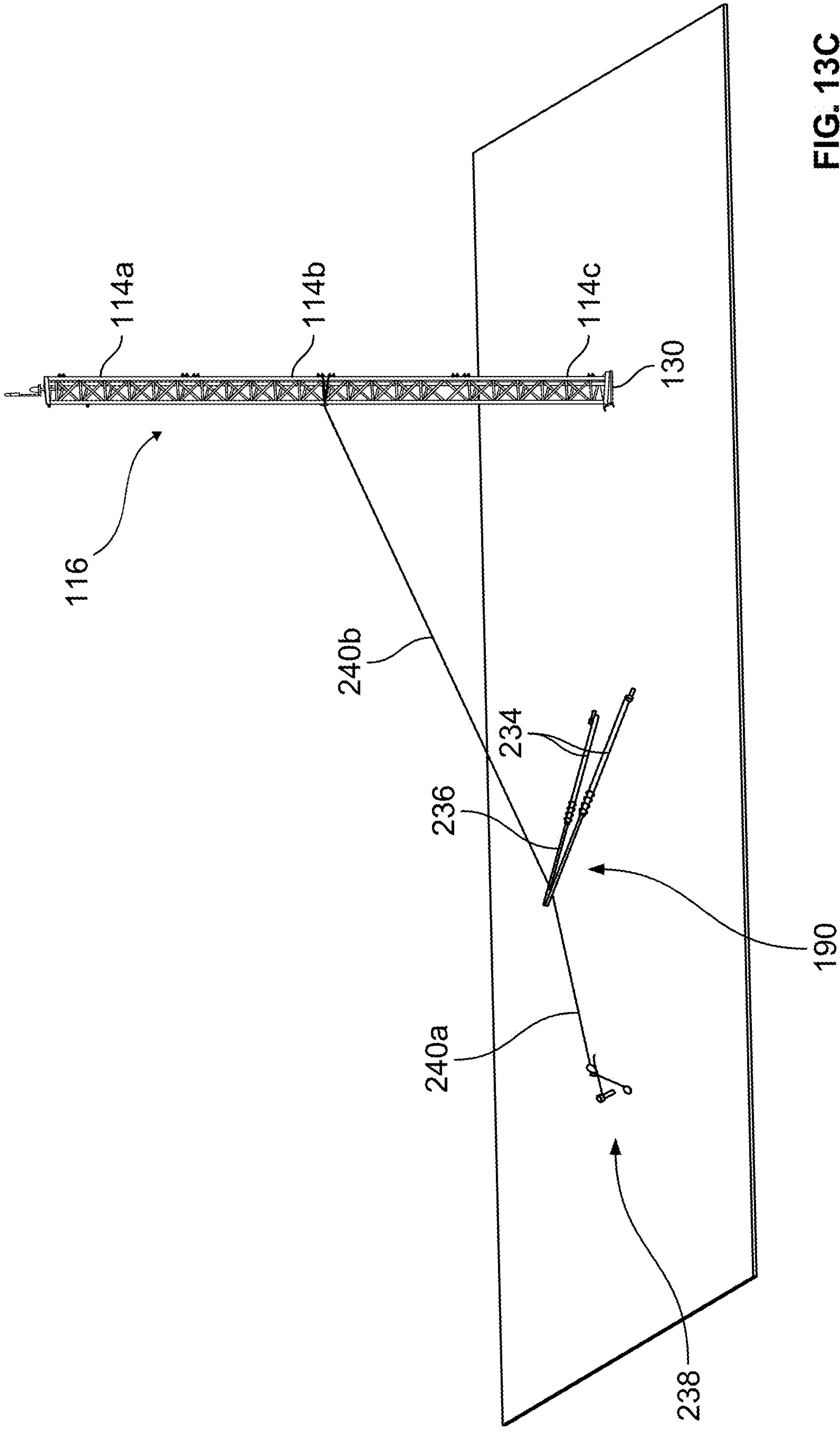
FIG. 13C shows the assembled ground tower of FIGS. 13A and 13B with the ground tower raised to an operational orientation with the separate pivot, according to one example approach.

Turning now to FIGS. 13A-13C, assembly and raising of the ground tower 116 is shown and described in further detail, according to an example approach. As noted above, the tower sections 114*a*, 114*b*, and 114*c* may be deployed from the pallet 126 upon arrival of the system 100 at a desired location. The tower sections 114 may generally be assembled together while laid upon a ground surface to form ground tower 116. Assembly of tower devices or other components to the ground tower 116, particularly those that extend perpendicularly or laterally away from the vertically/longitudinally extending ground tower 116, may be relatively easier and faster if installed before the tower 116 is raised to a vertical position, as opposed to after the ground tower is raiser to the vertical position. Further, by installing components to the ground tower 116 before raising the ground tower 116, it is not necessary for service/installation personnel to climb the tower once raised. Additionally, in some cases attachment of components to the ground tower 116 may be relatively more difficult with the ground tower 116 laid upon the ground surface. Moreover, the ground tower 116 may be relatively more difficult to raise to a vertical/operational position with tower devices or other components secured to the ground tower 116, as a result of the additional weight of the devices—particularly where the devices are located higher up on the ground tower, e.g., on the uppermost tower section 114*a*. Nevertheless, example methods of raising the ground tower 116 described below may be capable of raiding the ground tower 116 with some or even all of the components, e.g., antennas, booms, etc. attached to the ground tower 116.

Referring now to FIG. 13A, the pivot 190 may be assembled from an upper section 236, which includes two leg portions pivotally joined together at upper ends of each, and two lower sections 234, which may be secured to the legs of the upper portion 236 to create a single, relatively large v-shaped pivot 190. The pivot 190 may be used along with a winch 238 to lift the ground tower 116 to assist with assembly and raising of the ground tower 116. In other examples approaches, assistive devices other than winches, e.g., a ratcheting "come-along" or lever arm, may be used to lift the ground tower 116 by gradually shortening support or lifting wires/guides. The assembled pivot 190 may be relatively taller than the rack 124 (not shown in FIGS. 13A-13C); as described further below the pivot 190 generally uses the height of the pivot 190 to maintain the cable 240 in an elevated position relative to the ground tower 116, at least when the ground tower 116 is on the ground and as the ground tower 116 is being initially raised from the ground. Generally, as the ground tower 116 is lifted, the pivot 190 is tilted from the position illustrated in FIG. 13A toward the winch 238, with the lower sections 234 of the pivot remaining in a same position on the ground surface. The lower sections 234 may each have a ground engaging anchor 237, e.g., a spike or other feature for inhibiting or preventing movement of the lower sections 234 of the pivot 190 along the ground as the pivot 190 is tilted.

The ground tower 116 may initially be laid along the ground surface as shown in FIG. 13A, with the tower sections 114*a*, 114*b*, and 114*c* assembled together. Additionally, the lowermost tower section 114*c* may be pivotally fixed at a lower end adjacent the ground surface. For example, the base 130 may be fixed relative to the ground surface, e.g., by securing to the pallet 126 or rack 124. A lower edge of the tower section 114*c* may pivotally engage the base 130.

The winch 238 may be used to raise the ground tower 116 using winch cable 240, which may be secured to or guided by the pivot 190. In one example, the winch cable 240 may be a single cable extending from winch 238, through a pulley of the pivot 190, and to an attachment point on the ground tower 116. In this case, a guy wire or other support may be necessary to keep the pivot 190 generally vertical while the ground tower 116 is raised, with the lower portions 234 of the pivot 190 being generally stationary or fixed to the ground surface. In another example, the cable 240 may be positioned in a cleat (not shown) that maintains the positioning of the cable 240 on the pivot 190 until the pivot 190 is tilted sufficiently to release the cable 240, which at that time the ground tower 116 is sufficiently raised such that the pivot 190 is no longer needed. In still another example, the winch cable is separated into two components, with a first cable 240*a* extending from the winch 238 to the pivot 190, and a second cable 240*b* extending from the pivot 190 to the ground tower 116, in which case the pivot 190 itself will generally be initially tilted away from the winch 238. Accordingly, in this example, as the winch 238 pulls the cable 240 the upper portion 236 of the pivot 190 is moved toward the winch 238, generally tilting the pivot 190 toward the winch 238.

In any case, the pivot 190 generally elevates the winch cable(s) 240 relative to the ground tower 116, such that tension in the winch cable(s) 240 is at least partly in an upward/vertical direction relative to the location on the ground tower 116 where the cable 240 attaches. Accordingly, the pivot 190 resolves the tension of the winch cable 240 into a vertical component that more effectively lifts the ground tower 116 upward from the ground. As the base of the ground tower 116 remains generally fixed to the stationary base 130, the upper end of the ground tower 116 (i.e., at upper end of the tower section 114*a*) is lifted away from the ground, while the lower end (i.e., at lower end of the tower section 114*c*) remains pivotally fixed to the stationary base 130.

Turning now to FIG. 13B, the ground tower 116 is shown with a lower end thereof remaining pivotally fixed to the stationary base 130. The upper end of the ground tower 116, i.e., at the upper tower section 114*a*, is lifted off the ground, and as such the ground tower 116 is in an assembly orientation or position. The stand 182 may be moved to a deployed position where it extends generally perpendicularly away from the ground tower 116. Subsequently, with the upper end of the ground tower 116 spaced away from the ground surface, tower devices may be assembled to the ground tower 116. The spacing of the ground tower 116 away from the ground surface may allow for adequate space from the ground tower 116 for installation of tower devices that extend laterally away from the ground tower 116. For example, as shown in FIG. 13B, the lateral antenna(s) 184 may be installed, along with the support arms 186, all of which generally extend laterally away from the longitudinally-elongated ground tower 116. While not shown in FIG. 13B, if the cable 240 was used to initially raise the ground tower 116 from the ground to the assembly orientation illustrated in FIG. 13B the cable 240 may remain attached to the ground tower 116 while the stand 182 supports the ground tower 116 and the tower devices such as the antenna 184 and/or support arms 186 are secured (although the ground tower 116 may be sufficiently lightweight to be raised from the ground to the assembly orientation manually by one or two service personnel, and without use of the cable 240 and/or winch 238). Alternatively, to the extent the cable 240 was attached to the ground tower 116 to raise from the ground to the assembly orientation, the cable 240 may be temporarily removed during this stage and then reattached for raising the ground tower 116 further to an operational or substantially vertical position. The lower cables 132 and/or upper cables 134, which as discussed further below may be used during raising of the ground tower 116 from the assembly orientation to an operational orientation, may be attached to the ground tower 116 while the ground tower 116 is on the ground as shown in FIG. 13A or in the assembly orientation shown in FIG. 13B.

Turning now to FIG. 13C the assembled ground tower 116 is shown raised to an operational orientation or position, with the pivot 190 having been tilted toward the winch 238 as a result of the cable(s) 240 being retracted toward the winch 238. As the ground tower 116 is raised, the lower cables 132 and/or upper cables 134 may be used to provide support to the ground tower 116, thereby facilitating raising the ground tower 116 in a controlled manner, and generally preventing tipping of the ground tower 116 as its orientation becomes more vertical. Accordingly, the ground tower 116 is raised to an operational orientation to facilitate use of the main antenna 118, lateral antenna 184, and/or other components of the base station 108 (not shown in FIG. 13C).

Figure 14:
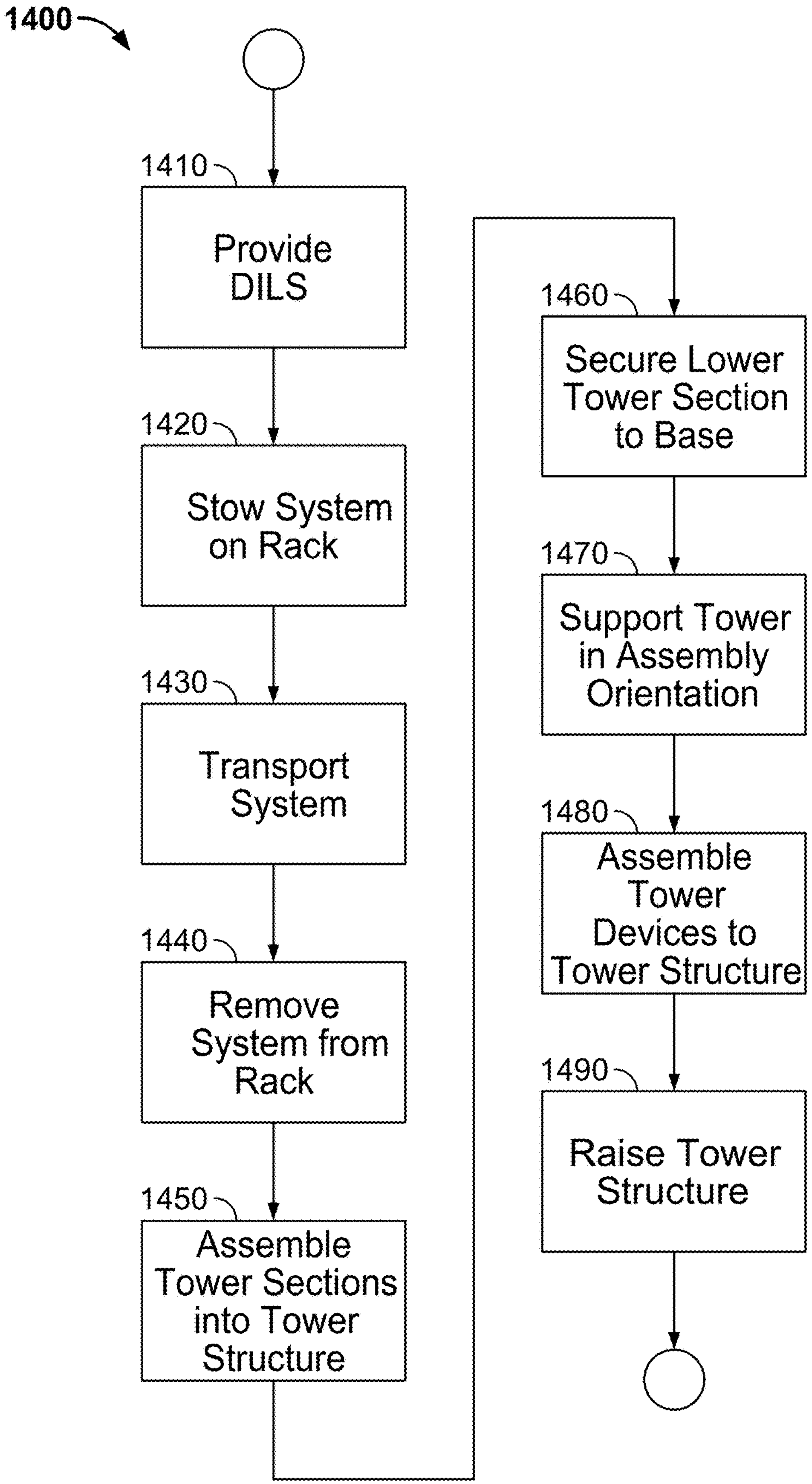
FIG. 14 shows a process flow diagram for a method of assembling and raising a ground tower, according to one example illustration.

Turning now to FIG. 14, a process flow diagram is shown for a process 1400 of assembling and raising of a ground tower, e.g., ground tower 116. Process 1400 may begin at block 1410, where a DILS is provided, e.g., system 100 as described above and as shown in FIG. 7. Proceeding to block 1420, the system 100 may be stowed upon a rack 124 and/or pallet 126, e.g., as described above and shown in FIGS. 9A-9E. At block 1430, the system 100 may be transported to a site for installation, e.g., at a landing field.

Proceeding to block 1440, the various components of the system 100 may be removed from the rack 124 for deployment and assembly, e.g., in the example manner described above.

At block 1450, a plurality of tower sections may be assembled into a ground tower structure. For example, as discussed above and illustrated in FIG. 13A, the tower sections 114, including a lower tower section configured to be positioned at a ground surface, e.g., tower section 114*c*, and one or more upper tower sections configured to be elevated relative to the lower section, e.g., tower section 114*b* and/or 114*a*, may be assembled into a generally single ground tower structure. It should be noted that a lower tower section, e.g., tower section 114*c*, need not be positioned in direct contact with the ground surface to be "configured to be positioned at" a ground surface. Merely by way of example, as described herein the tower section 114*c* may be positioned upon the stationary base 130, and thus be "positioned at a ground surface" after the ground tower 116 is raised to an operational orientation. Further, as noted above a stand 182 may be pivotally secured to an upper tower section, e.g., tower section 114*a*.

At block 1460, the lower tower section may be pivotally secured to a stationary ground base, e.g., stationary base 130. Further, as noted above, the stationary base 130 may be secured to the rack 124, e.g., by securing an edge of the stationary base 130 to the pallet 126, to which the rack 124 is generally fixed. The securing of the stationary base 130 to the pallet 126 may thereby generally prevent translation of the ground tower 116 and/or tower section 114*c* during assembly, raising, an operation of the ground tower 116. In should be noted that while block 1460 is described as occurring after block 1450, the lower tower section 114*c* may be pivotally secured to the stationary base 130 prior to assembly of the tower sections 114 a and/or 114*b* to the lower tower section 114*c*. Process 1400 may then proceed to block 1470.

At block 1470, an end of the assembled tower structure may be supported away from the ground surface with the stand, such that the ground tower is in an assembly orientation. For example, as shown above in FIG. 13B, the ground tower 116 is generally horizontal. For purposes of this description, positioning the ground tower 116 generally horizontal may be defined as positioning the ground tower 116 at an angle with respect to the ground surface at an angle of no more than 45 degrees. Further, as noted above the lower tower section, e.g., tower section 114*c*, may remain secured to the stationary base 130. Proceeding to block 1480, one or more tower devices may be assembled to the assembled tower sections 114, e.g., lateral antenna 184, support arms 186, sections 118 of the main antenna, etc. while the tower sections 114 and/or ground tower 116 are in the assembly orientation. Lower cables 132 and/or upper cables 134 may also be secured to the ground tower 116, if not already secured. Process 1400 may then proceed to block 1490.

At block 1490, the tower structure, e.g., assembled tower sections 114 or the ground tower 116, may be raised toward an operational orientation, e.g., in which the ground tower 116 extends substantially vertically from the ground surface. For example, the ground tower 116 may be raised from the assembly position illustrated in FIG. 13B to a substantially vertical position illustrated in FIG. 13C. For purposes of this description, positioning the ground tower 116 substantially vertical is defined as positioning the ground tower 116 at an angle with respect to vertical of no more than 30 degrees, or at an angle with respect to the ground of at least 60 degrees. In some embodiments, the ground tower 116 is positioned at an angle with respect to vertical of no more than 25 degrees, 20 degrees, 15 degrees, 10 degrees, or 5 degrees. The lower tower section 114*c* may, as the ground tower 116 is raised, generally remain pivotally anchored to the ground base 130, thereby preventing translation of the lower tower section 114*c* with respect to the ground surface while an upper end of the tower structure, e.g., the uppermost tower section 114*a*, is raised. Moreover, the winch 238 and pivot 190 may be used to generally facilitate raising the ground tower 116 toward the operational orientation with a load line, e.g., the cable(s) 240. The pivot 190 may generally maintain the cable(s) 240 vertically away from the ground surface while tension in the cable(s) 240 is applied via the winch 238, thereby raising the ground tower 116 toward the operational position. Further, as noted above, the pivot 190 may generally be anchored in place at the ground surface, e.g., via a pivot support anchor 237 defined by engagement of the lower portions 234 with the ground surface. Accordingly, as the winch 238 retracts the cable 240, the pivot 190 may generally pivot or tilt toward the winch 238 while the ground tower 116 is raised toward the operational position. The ground tower 116 may be supported by the lower cables 132 and/or upper cables 134 as the ground tower 116 is raised toward the operational orientation. In an example, a first service personnel may operate winch 238, slowly raising the ground tower 116, while a second service personnel may gradually adjust length of the lower and/or upper cables 132, 134 as needed to support the ground tower 116 as the ground tower 116 moves toward the operational orientation. Lower cables 132 and/or upper cables 134 may thereby cooperate with the cable 240 to raise the ground tower 116 in a controlled manner and prevent tipping.

With the ground tower 116 raised, additional components of the system 100 may also be deployed. Merely as examples, the remote antenna assemblies 102, 104*a*, 104*b*, and 106 may each be deployed to an appropriate position relative to the base station 108 and/or a runway, and connections for communication and power may be made by way of cables, wireless connections, or the like. Process 1400 may then terminate. It should be noted that the system 100 may subsequently be disassembled and stowed upon the rack 124 and/or pallet 126, e.g., for transport to another site.

The system 100 and process 1400 described above may generally provide a relatively small and lightweight packaging size for transport of the system 100 to a landing site. Furthermore, as noted above, the overall time required to set up the system 100 for operation, as well as to take down the system 100, are relatively reduced as a result of the various features described herein. Merely as examples, the use of latches 140 that allow fixing components together without tools reduces assembly time and packaging weight due to the reduced or eliminated need for such tools. Additionally, the stand 182 and pivot 190 each facilitate assembly and raising of a ground tower 116, which provides a single elevated structure for the system 100.

The foregoing description includes exemplary embodiments in accordance with the present disclosure. These examples are provided for purposes of illustration only, and not for purposes of limitation. Merely as one example, steps or portions of example methods described herein may be performed in any order or manner convenient and as such example methods are not limited to the particular order of description herein, e.g., as noted above regarding blocks 1450 and block 1460 of the process 1400. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A storage rack comprising:

a base structure configured to be secured upon a single pallet;

a plurality of vertically extending support members fixed to the base structure and at least partially defining an enclosure, the enclosure separated into a main enclosure and an upper enclosure elevated from the base structure; and a hinged structure pivotally mounted to the support members, the hinged structure configured to enclose an interior storage area separate from and laterally adjacent to the_upper enclosure in a closed position, the hinged structure pivotable from the closed position to an open position allowing access to the interior storage area.

2. The storage rack of claim 1, further comprising a horizontally movable track disposed in the upper enclosure.

3. The storage rack of claim 2, further comprising a plurality of enclosed cases stowed on the horizontally movable track.

4. The storage rack of claim 1, wherein:

the hinged structure has an inner side facing the interior storage area and an outer side opposite the inner side;

the outer side comprises a storage rack;

the interior storage area is configured to store a plurality of antenna sections for at least one base station antenna or at least one of a plurality of remote antenna assemblies when the hinged structure is in the closed position; and at least multiple of the plurality of antenna sections are stored on the outer side of the hinged structure.

5. The storage rack of claim 1, wherein the hinged structure is pivotally mounted at an upper end of the hinged structure, such that the hinged structure is raised from the closed position to the open position.

6. The storage rack of claim 1, further comprising a pair of upper support members horizontally extending from the vertically extending support members, wherein the hinged structure is pivotally mounted to the upper support members.

7. The storage rack of claim 6, further comprising a pair of lower support members horizontally extending from the vertically extending support members.

8. The storage rack of claim 7, wherein a lower end of the hinged structure is configured to be secured to the lower support members when the hinged structure is in the closed position.

9. The storage rack of claim 1, wherein the plurality of vertically extending support members includes a front plurality of support members and a rear plurality of support members.

10. The storage rack of claim 9, wherein a horizontally moveable track is positioned on an upper structure between the front plurality of support members and the rear plurality of support members.

11. The storage rack of claim 9, wherein the interior storage area is adjacent the front plurality of support members.

12. The storage rack of claim 9, wherein at least a plurality of modular tower sections are stowed on the rear plurality of support members.

13. The storage rack of claim 1, wherein a plurality of remote antenna assemblies is stored in the interior storage area.

14. The storage rack of claim 1, wherein:

the upper enclosure is positioned above the main enclosure; and one or more reels are coupled to an outer side of the upper enclosure.

15. The storage rack of claim 1, further comprising a horizontally extending structure dividing the enclosure into the main enclosure and the upper enclosure.

16. A storage rack comprising:

a base structure configured to be secured upon a single pallet;

a plurality of wall members fixed to the base structure and extending vertically to at least partially define an enclosure, the enclosure separated into a main enclosure and an upper enclosure elevated from the base structure; and a hinged structure pivotally mounted to one or more of the wall members, the hinged structure configured to enclose an interior storage area separate from and laterally adjacent to the upper enclosure in a closed position, the hinged structure pivotable from the closed position to an open position allowing access to the interior storage area.

17. The storage rack of claim 16, wherein:

the hinged structure has an inner side facing the interior storage area and an outer side opposite the inner side;

the outer side comprises a storage rack;

the interior storage area is configured to store a plurality of antenna sections for at least one base station antenna or at least one of a plurality of remote antenna assemblies when the hinged structure is in the closed position; and at least multiple of the plurality of antenna sections are stored on the outer side of the hinged structure.

18. The storage rack of claim 16, wherein the hinged structure is pivotally mounted at an upper end of the hinged structure, such that the hinged structure is raised from the closed position to the open position.

19. The storage rack of claim 16, further comprising a pair of upper support members horizontally extending from the wall members, wherein the hinged structure is pivotally mounted to the upper support members.

20. The storage rack of claim 19, further comprising a pair of lower support members horizontally extending from the wall members, wherein a lower end of the hinged structure is configured to be secured to the lower support members when the hinged structure is in the closed position.

* * * * *